(12) United States Patent
Ju et al.

(10) Patent No.: US 11,936,294 B2
(45) Date of Patent: Mar. 19, 2024

(54) THREE-LEVEL CONVERTER, CONTROL METHOD THEREOF, AND POWER SUPPLY SYSTEM

(71) Applicant: Huawei Digital Power Technologies Co., Ltd., Shenzhen (CN)

(72) Inventors: Hualei Ju, Shanghai (CN); Zhiwu Xu, Shenzhen (CN); Lin Li, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/946,227

(22) Filed: Sep. 16, 2022

(65) Prior Publication Data

US 2023/0087302 A1 Mar. 23, 2023

(30) Foreign Application Priority Data

Sep. 17, 2021 (CN) .......................... 202111095041.X

(51) Int. Cl.
*H02M 3/07* (2006.01)
*H02M 1/00* (2006.01)
H02M 7/483 (2007.01)

(52) U.S. Cl.
CPC ........... *H02M 3/07* (2013.01); *H02M 1/0095* (2021.05); *H02J 2300/24* (2020.01); *H02M 7/4837* (2021.05)

(58) Field of Classification Search
None
See application file for complete search history.

(56) References Cited

U.S. PATENT DOCUMENTS

| 8,773,082 B2* | 7/2014 | Urakabe | H02M 7/4837 |
| | | | 323/225 |
| 9,893,619 B2* | 2/2018 | Kihara | H02P 1/18 |
| 10,910,950 B2* | 2/2021 | Kihara | G01R 19/16528 |
| 2017/0279356 A1 | 9/2017 | Kihara et al. | |

FOREIGN PATENT DOCUMENTS

| CN | 110401344 A | 11/2019 |
| JP | 2019180110 A | 10/2019 |

OTHER PUBLICATIONS

Paulino et al., "A Review of the Main Inverter Topologies Applied on the Integration of Renewable Energy Resources to the Grid", Power Electronics Conference (COBEP), 2011 Brazilian, IEEE, Sep. 11, 2011, XP031999440, pp. 963-969.

* cited by examiner

*Primary Examiner* — Jeffery S Zweizig
(74) *Attorney, Agent, or Firm* — Maier & Maier, PLLC

(57) ABSTRACT

A three-level converter includes a high-voltage side unit, a low-voltage side unit, a flying capacitor, a first switch to a fourth switch, and a control unit. When a voltage of the flying capacitor falls outside a safe target voltage range, the control unit may control the third switch and the fourth switch to be normally open, and control, based on the voltage of the flying capacitor and a voltage of the low-voltage side unit, each of the first switch and the second switch to be turned on or off, so that the voltage of the flying capacitor falls within the target voltage range. Alternatively, the control unit may control the first switch and the second switch to be normally open, and control, based on the voltage of the flying capacitor and a voltage of the low-voltage side unit.

19 Claims, 11 Drawing Sheets

THREE-LEVEL CONVERTER, CONTROL METHOD THEREOF, AND POWER SUPPLY SYSTEM

CROSS-REFERENCE TO RELATED APPLICATION

This application claims priority to Chinese Patent Application No. 202111095041.X, filed on Sep. 17, 2021, which is hereby incorporated by reference in its entirety.

TECHNICAL FIELD

The embodiments relate to the field of power electronics technologies, a three-level converter, a control method thereof, and a power supply system.

BACKGROUND

Currently, due to advantages of improving a switching frequency and reducing a size and costs of a chopper inductor, a flying-capacitor-based three-level chopper circuit is widely applied to high input voltage and medium- and high-power scenarios. Generally, the flying-capacitor-based three-level chopper circuit includes a power supply and a flying capacitor. To better reduce a high-order harmonic in an output voltage of the circuit, a voltage of the flying capacitor needs to be controlled within a safe voltage range. The safe voltage range herein is a voltage range that is greater than (half-intermediate direct current voltage−deviation) and less than (half-intermediate direct current voltage+ deviation), where the half-intermediate direct current voltage is half of a power voltage. In the conventional technology, a charge loop or a discharge loop may be added to the flying-capacitor-based three-level chopper circuit, and the flying capacitor may be charged by using the charge loop or controlled to discharge by using the discharge loop, so that the voltage of the flying capacitor falls within the safe voltage range. However, costs of adding the charge loop or the discharge loop are high, and a system structure is complex.

SUMMARY

The embodiments may provide a three-level converter and a control method thereof, and a power supply system, to control a voltage of a flying capacitor within a target voltage range by triggering different switches. A system structure is simple, costs are low, and applicability is high.

According to a first aspect, the embodiments may provide a three-level converter. The three-level converter includes a high-voltage side unit, a low-voltage side unit, a flying capacitor, a first switch, a second switch, a third switch, a fourth switch, and a control unit. A voltage of the high-voltage side unit herein is greater than that of the low-voltage side unit. The high-voltage side unit may include but is not limited to a capacitor. The low-voltage side unit may include but is not limited to a capacitor, an inductor, and a battery. For example, the low-voltage side unit may include an inductor and a capacitor that are connected in series, or the low-voltage side unit may include a capacitor, an inductor, and a battery; the inductor is connected in series to the capacitor; and the capacitor is connected in parallel to the battery. The first switch, the second switch, the third switch, and the fourth switch may be connected in series and connected in parallel to the high-voltage side unit. A series connection point of the first switch and the second switch may be connected to a series connection point of the third switch and the fourth switch by using the flying capacitor. The third switch and the fourth switch may be connected in series and connected in parallel to the low-voltage side unit. The first switch and the fourth switch herein may be understood as outer transistor switches, and the second switch and the third switch may be understood as inner transistor switches. When a voltage of the flying capacitor falls outside a target voltage range (that is, a safe voltage range) and the three-level converter is in a buck working mode, the control unit may be configured to control the third switch and the fourth switch to be normally open (in this case, the three-level converter may be simplified as a three-level buck converter), and control, based on the voltage of the flying capacitor and the voltage of the low-voltage side unit, the first switch and the second switch to be turned on or off. Therefore, the high-voltage side unit may be controlled to charge the flying capacitor or the flying capacitor may be controlled to discharge to the low-voltage side unit, so that the voltage of the flying capacitor falls within the target voltage range. Alternatively, when a voltage of the flying capacitor falls outside a target voltage range and the three-level converter is in a boost working mode, the control unit may control the first switch and the second switch to be normally open (in this case, the three-level converter may be simplified as a three-level boost converter), and control, based on the voltage of the flying capacitor and the voltage of the low-voltage side unit, the third switch and the fourth switch to be turned on or off. Therefore, the low-voltage side unit may be controlled to charge the flying capacitor or the flying capacitor may be controlled to discharge to the high-voltage side unit, so that the voltage of the flying capacitor falls within the target voltage range. The target voltage range herein may be a voltage range that is greater than a difference between a half-intermediate direct current voltage and a preset deviation and is less than a sum of the half-intermediate direct current voltage and the preset deviation. The half-intermediate direct current voltage is half of the voltage of the high-voltage side unit. The preset deviation may be a deviation configured by a user, or a deviation configured by the three-level converter for the flying capacitor, which may be determined depending on an actual application scenario. Details are not described herein.

When the three-level converter is in different working modes, the flying capacitor may be charged or controlled to discharge by triggering different outer transistor switches and inner transistor switches, so that the voltage of the flying capacitor falls within the target voltage range without adding a charge loop or a discharge loop. Therefore, hardware costs are reduced, costs are lower, a system structure is simple, and applicability is high.

With reference to the first aspect, in a first possible implementation, when the three-level converter is in the buck working mode and the flying capacitor is undervoltage, the high-voltage side unit needs to be controlled to charge the flying capacitor. When the voltage of the flying capacitor is less than a lower voltage limit within the target voltage range (that is, the flying capacitor is undervoltage) and the voltage of the flying capacitor is less than that of the low-voltage side unit, the control unit may control the first switch to be normally closed, and control the second switch to be turned on in a first time period and to be turned off in a second time period. Therefore, the high-voltage side unit may be controlled to charge the flying capacitor, so that the voltage of the flying capacitor falls within the target voltage range. The first time period may be understood as a time period that falls within a switching period of the second switch and that is earlier than the second time period. The lower voltage limit within the target voltage range herein is the difference between the half-intermediate direct current voltage and the preset deviation. When the three-level converter is in the buck working mode and the flying capacitor is undervoltage, drive from the first switch to the second switch may be controlled to be unidirectionally increased. Therefore, the high-voltage side unit may be controlled to charge the flying capacitor, so that the voltage of the flying capacitor falls within the target voltage range, and the flying capacitor may be charged without adding the charge loop. Therefore, the hardware costs are reduced, the costs are lower, the system structure is simple, and the applicability is high.

With reference to the first aspect, in a second possible implementation, when the three-level converter is in the buck working mode and the flying capacitor is undervoltage, the high-voltage side unit needs to be controlled to charge the flying capacitor. When the voltage of the flying capacitor is less than a lower voltage limit within the target voltage range and the voltage of the flying capacitor is greater than that of the low-voltage side unit, the control unit may control the second switch to be normally open, and control the first switch to be turned on in a first time period and to be turned off in a second time period. Therefore, the high-voltage side unit may be controlled to charge the flying capacitor, so that the voltage of the flying capacitor falls within the target voltage range. The first time period may be understood as a time period that falls within a switching period of the first switch and that is earlier than the second time period. When the three-level converter is in the buck working mode and the flying capacitor is undervoltage, drive from the first switch to the second switch may be controlled to be unidirectionally increased. Therefore, the high-voltage side unit may be controlled to charge the flying capacitor, so that the voltage of the flying capacitor falls within the target voltage range, and the flying capacitor may be charged without adding the charge loop. Therefore, the hardware costs are reduced, the costs are lower, the system structure is simple, and the applicability is high.

With reference to the first aspect, in a third possible implementation, when the three-level converter is in the buck working mode and the flying capacitor is overvoltage, the flying capacitor needs to be controlled to discharge to the low-voltage side unit. When the voltage of the flying capacitor is greater than an upper voltage limit within the target voltage range (that is, the flying capacitor is overvoltage) and the voltage of the flying capacitor is less than that of the low-voltage side unit, the control unit may control the second switch to be normally closed, and control the first switch to be turned on in a first time period and to be turned off in a second time period. Therefore, the flying capacitor may be controlled to discharge to the low-voltage side unit, so that the voltage of the flying capacitor falls within the target voltage range. The first time period may be understood as a time period that falls within a switching period of the first switch and that is earlier than the second time period. The upper voltage limit within the target voltage range herein may be the sum of the half-intermediate direct current voltage and the preset deviation. When the three-level converter is in the buck working mode and the flying capacitor is overvoltage, drive from the second switch to the first switch may be controlled to be unidirectionally increased. Therefore, the flying capacitor may be controlled to discharge to the low-voltage side unit, so that the voltage of the flying capacitor falls within the target voltage range, and the flying capacitor may be controlled to discharge without adding the discharge loop. Therefore, the hardware costs are reduced, the costs are lower, the system structure is simple, and the applicability is high.

With reference to the first aspect, in a fourth possible implementation, when the three-level converter is in the buck working mode and the flying capacitor is overvoltage, the flying capacitor needs to be controlled to discharge to the low-voltage side unit. When the voltage of the flying capacitor is greater than an upper voltage limit within the target voltage range and the voltage of the flying capacitor is greater than that of the low-voltage side unit, the control unit may control the first switch to be normally open and control the second switch to be turned on in a first time period and to be turned off in a second time period. Therefore, the flying capacitor may be controlled to discharge to the low-voltage side unit, so that the voltage of the flying capacitor falls within the target voltage range. The first time period may be understood as a time period that falls within a switching period of the second switch and that is earlier than the second time period. When the three-level converter is in the buck working mode and the flying capacitor is overvoltage, drive from the second switch to the first switch may be controlled to be unidirectionally increased. Therefore, the flying capacitor may be controlled to discharge to the low-voltage side unit, so that the voltage of the flying capacitor falls within the target voltage range, and the flying capacitor may be controlled to discharge without adding the discharge loop. Therefore, the hardware costs are reduced, the costs are lower, the system structure is simple, and the applicability is high.

With reference to the first aspect, in a fifth possible implementation, when the three-level converter is in the boost working mode and the flying capacitor is undervoltage, the low-voltage side unit needs to be controlled to charge the flying capacitor. When the voltage of the flying capacitor is less than a lower voltage limit within the target voltage range and the voltage of the flying capacitor is less than that of the low-voltage side unit, the control unit may control the third switch to be normally open and control the fourth switch to be turned on in a first time period and to be turned off in a second time period. Therefore, the low-voltage side unit may be controlled to charge the flying capacitor, so that the voltage of the flying capacitor falls within the target voltage range. The first time period may be understood as a time period that falls within a switching period of the fourth switch and that is earlier than the second time period. When the three-level converter is in the boost working mode and the flying capacitor is undervoltage, drive from the fourth switch to the third switch may be controlled to be unidirectionally increased. Therefore, the low-voltage side unit may be controlled to charge the flying capacitor, so that the voltage of the flying capacitor falls within the target voltage range, and the flying capacitor may be charged without adding the charge loop. Therefore, the hardware costs are reduced, the costs are lower, the system structure is simple, and the applicability is high.

With reference to the first aspect, in a sixth possible implementation, when the three-level converter is in the boost working mode and the flying capacitor is undervoltage, the low-voltage side unit needs to be controlled to charge the flying capacitor. The control unit may be configured to: when the voltage of the flying capacitor is less than a lower voltage limit within the target voltage range and the voltage of the flying capacitor is greater than that of the low-voltage side unit, control the fourth switch to be normally closed, and control the third switch to be turned on in a first time period and to be turned off in a second time period, and control the high-voltage side unit to charge an inductor in the low-voltage side unit/store energy in the inductor in the first time period, and after energy storage is complete, control the inductor to charge the flying capacitor in the second time period. Therefore, the low-voltage side unit may be controlled to charge the flying capacitor, so that the voltage of the flying capacitor falls within the target voltage range. The first time period may be understood as a time period that falls within a switching period of the third switch and that is earlier than the second time period. When the three-level converter is in the boost working mode and the flying capacitor is undervoltage, drive from the fourth switch to the third switch may be controlled to be unidirectionally increased. Therefore, the low-voltage side unit may be controlled to charge the flying capacitor, so that the voltage of the flying capacitor falls within the target voltage range, and the flying capacitor may be charged without adding the charge loop. Therefore, the hardware costs are reduced, the costs are lower, the system structure is simple, and the applicability is high.

With reference to the first aspect, in a seventh possible implementation, when the three-level converter is in the boost working mode and the flying capacitor is overvoltage, the flying capacitor needs to be controlled to discharge to the high-voltage side unit. When the voltage of the flying capacitor is greater than an upper voltage limit within the target voltage range and the voltage of the flying capacitor is less than that of the low-voltage side unit, the control unit may control the fourth switch to be normally open and control the third switch to be turned on in a first time period and to be turned off in a second time period. Therefore, the flying capacitor may be controlled to discharge to the high-voltage side unit, so that the voltage of the flying capacitor falls within the target voltage range. The first time period may be understood as a time period that falls within a switching period of the third switch and that is earlier than the second time period. When the three-level converter is in the boost working mode and the flying capacitor is overvoltage, drive of the third switch to the fourth switch may be controlled to be unidirectionally increased. Therefore, the flying capacitor may be controlled to discharge to the high-voltage side unit, so that the voltage of the flying capacitor falls within the target voltage range, and the flying capacitor may be controlled to discharge without adding the discharge loop. Therefore, the hardware costs are reduced, the costs are lower, the system structure is simple, and the applicability is high.

With reference to the first aspect, in an eighth possible implementation, when the three-level converter is in the boost working mode and the flying capacitor is overvoltage, the flying capacitor needs to be controlled to discharge to the high-voltage side unit. The control unit may be configured to: when the voltage of the flying capacitor is greater than an upper voltage limit within the target voltage range and the voltage of the flying capacitor is greater than that of the low-voltage side unit, control the third switch to be normally closed, and control the fourth switch to be turned on in a first time period and to be turned off in a second time period, and control the high-voltage side unit to charge the inductor in the low-voltage side unit/store the energy in the inductor in the first time period, and after the energy storage is complete, control the inductor to discharge to the low-voltage side unit in the second time period. Therefore, the flying capacitor may be controlled to discharge to the high-voltage side unit, so that the voltage of the flying capacitor falls within the target voltage range. The first time period may be understood as a time period that falls within a switching period of the fourth switch and that is earlier than the second time period. When the three-level converter is in the boost working mode and the flying capacitor is overvoltage, the drive of the third switch to the fourth switch may be controlled to be unidirectionally increased. Therefore, the flying capacitor may be controlled to discharge to the high-voltage side unit, so that the voltage of the flying capacitor falls within the target voltage range, and the flying capacitor may be controlled to discharge without adding the discharge loop. Therefore, the hardware costs are reduced, the costs are lower, the system structure is simple, and the applicability is high.

According to a second aspect, the embodiments may provide a control method of a three-level converter. The method is applicable to a control unit in the three-level converter; the three-level converter further includes a high-voltage side unit, a low-voltage side unit, a flying capacitor, a first switch, a second switch, a third switch, and a fourth switch. The first switch, the second switch, the third switch, and the fourth switch are connected in series and connected in parallel to the high-voltage side unit; a series connection point of the first switch and the second switch is connected to a series connection point of the third switch and the fourth switch by using the flying capacitor; and the third switch and the fourth switch are connected in series and connected in parallel to the low-voltage side unit. The first switch and the fourth switch herein may be understood as outer transistor switches, and the second switch and the third switch may be understood as inner transistor switches. According to the method, when a voltage of the flying capacitor falls outside a target voltage range (that is, a safe voltage range) and the three-level converter is in a buck working mode, the control unit may be configured to control the third switch and the fourth switch to be normally open, and control, based on the voltage of the flying capacitor and the voltage of the low-voltage side unit, the first switch and the second switch to be turned on or off. Therefore, the high-voltage side unit may be controlled to charge the flying capacitor or the flying capacitor may be controlled to discharge to the low-voltage side unit, so that the voltage of the flying capacitor falls within the target voltage range. Alternatively, when a voltage of the flying capacitor falls outside a target voltage range and the three-level converter is in a boost working mode, the control unit may control the first switch and the second switch to be normally open, and control, based on the voltage of the flying capacitor and the voltage of the low-voltage side unit, the third switch and the fourth switch to be turned on or off. Therefore, the low-voltage side unit may be controlled to charge the flying capacitor or the flying capacitor may be controlled to discharge to the high-voltage side unit, so that the voltage of the flying capacitor falls within the target voltage range. When the three-level converter is in different working modes, the flying capacitor may be charged or controlled to discharge by triggering different outer transistor switches and inner transistor switches, so that the voltage of the flying capacitor falls within the target voltage range without adding a charge loop or a discharge loop. Therefore, hardware costs are reduced, costs are lower, a system structure is simple, and applicability is high.

With reference to the second aspect, in a first possible implementation, when the three-level converter is in the buck working mode and the flying capacitor is undervoltage, the high-voltage side unit needs to be controlled to charge the flying capacitor. When the voltage of the flying capacitor is less than a lower voltage limit within the target voltage range (that is, the flying capacitor is undervoltage) and the voltage of the flying capacitor is less than that of the low-voltage side unit, the control unit may control the first switch to be normally closed, and control the second switch to be turned on in a first time period and to be turned off in a second time period. Therefore, the high-voltage side unit may be controlled to charge the flying capacitor, so that the voltage of the flying capacitor falls within the target voltage range. The first time period may be understood as a time period that falls within a switching period of the second switch and that is earlier than the second time period. When the three-level converter is in the buck working mode and the flying capacitor is undervoltage, drive from the first switch to the second switch may be controlled to be unidirectionally increased. Therefore, the high-voltage side unit may be controlled to charge the flying capacitor, so that the voltage of the flying capacitor falls within the target voltage range, and the flying capacitor may be charged without adding the charge loop. Therefore, the hardware costs are reduced, the costs are lower, the system structure is simple, and the applicability is high.

With reference to the second aspect, in a second possible implementation, when the three-level converter is in the buck working mode and the flying capacitor is undervoltage, the high-voltage side unit needs to be controlled to charge the flying capacitor. When the voltage of the flying capacitor is less than a lower voltage limit within the target voltage range and the voltage of the flying capacitor is greater than that of the low-voltage side unit, the control unit may control the second switch to be normally open and control the first switch to be turned on in a first time period and to be turned off in a second time period. Therefore, the high-voltage side unit may be controlled to charge the flying capacitor, so that the voltage of the flying capacitor falls within the target voltage range. The first time period may be understood as a time period that falls within a switching period of the first switch and that is earlier than the second time period. When the three-level converter is in the buck working mode and the flying capacitor is undervoltage, drive from the first switch to the second switch may be controlled to be unidirectionally increased. Therefore, the high-voltage side unit may be controlled to charge the flying capacitor, so that the voltage of the flying capacitor falls within the target voltage range, and the flying capacitor may be charged without adding the charge loop. Therefore, the hardware costs are reduced, the costs are lower, the system structure is simple, and the applicability is high.

With reference to the second aspect, in a third possible implementation, when the three-level converter is in the buck working mode and the flying capacitor is overvoltage, the flying capacitor needs to be controlled to discharge to the low-voltage side unit. When the voltage of the flying capacitor is greater than an upper voltage limit within the target voltage range (that is, the flying capacitor is overvoltage) and the voltage of the flying capacitor is less than that of the low-voltage side unit, the control unit may control the second switch to be normally closed, and control the first switch to be turned on in a first time period and to be turned off in a second time period. Therefore, the flying capacitor may be controlled to discharge to the low-voltage side unit, so that the voltage of the flying capacitor falls within the target voltage range. The first time period may be understood as a time period that falls within a switching period of the first switch and that is earlier than the second time period. When the three-level converter is in the buck working mode and the flying capacitor is overvoltage, drive from the second switch to the first switch may be controlled to be unidirectionally increased. Therefore, the flying capacitor may be controlled to discharge to the low-voltage side unit, so that the voltage of the flying capacitor falls within the target voltage range, and the flying capacitor may be controlled to discharge without adding the discharge loop. Therefore, the hardware costs are reduced, the costs are lower, the system structure is simple, and the applicability is high.

With reference to the second aspect, in a fourth possible implementation, when the three-level converter is in the buck working mode and the flying capacitor is overvoltage, the flying capacitor needs to be controlled to discharge to the low-voltage side unit. When the voltage of the flying capacitor is greater than an upper voltage limit within the target voltage range and the voltage of the flying capacitor is greater than that of the low-voltage side unit, the control unit may control the first switch to be normally open and control the second switch to be turned on in a first time period and to be turned off in a second time period. Therefore, the flying capacitor may be controlled to discharge to the low-voltage side unit, so that the voltage of the flying capacitor falls within the target voltage range. The first time period may be understood as a time period that falls within a switching period of the second switch and that is earlier than the second time period. When the three-level converter is in the buck working mode and the flying capacitor is overvoltage, drive from the second switch to the first switch may be controlled to be unidirectionally increased. Therefore, the flying capacitor may be controlled to discharge to the low-voltage side unit, so that the voltage of the flying capacitor falls within the target voltage range, and the flying capacitor may be controlled to discharge without adding the discharge loop. Therefore, the hardware costs are reduced, the costs are lower, the system structure is simple, and the applicability is high.

With reference to the second aspect, in a fifth possible implementation, when the three-level converter is in the boost working mode and the flying capacitor is undervoltage, the low-voltage side unit needs to be controlled to charge the flying capacitor. When the voltage of the flying capacitor is less than a lower voltage limit within the target voltage range and the voltage of the flying capacitor is less than that of the low-voltage side unit, the control unit may control the third switch to be normally open and control the fourth switch to be turned on in a first time period and to be turned off in a second time period. Therefore, the low-voltage side unit may be controlled to charge the flying capacitor, so that the voltage of the flying capacitor falls within the target voltage range. The first time period may be understood as a time period that falls within a switching period of a fourth switch and that is earlier than the second time period. When the three-level converter is in the boost working mode and the flying capacitor is undervoltage, drive from the fourth switch to the third switch may be controlled to be unidirectionally increased. Therefore, the low-voltage side unit may be controlled to charge the flying capacitor, so that the voltage of the flying capacitor falls within the target voltage range, and the flying capacitor may be charged without adding the charge loop. Therefore, the hardware costs are reduced, the costs are lower, the system structure is simple, and the applicability is high.

With reference to the second aspect, in a sixth possible implementation, when the three-level converter is in the boost working mode and the flying capacitor is undervoltage, the low-voltage side unit needs to be controlled to charge the flying capacitor. When the voltage of the flying capacitor is less than a lower voltage limit within the target voltage range and the voltage of the flying capacitor is greater than that of the low-voltage side unit, the control unit may control the fourth switch to be normally closed and control the third switch to be turned on in a first time period and to be turned off in a second time period. Therefore, the low-voltage side unit may be controlled to charge the flying capacitor, so that the voltage of the flying capacitor falls within the target voltage range. The first time period may be understood as a time period that falls within a switching period of the third switch and that is earlier than the second time period. When the three-level converter is in the boost working mode and the flying capacitor is undervoltage, drive from the fourth switch to the third switch may be controlled to be unidirectionally increased. Therefore, the low-voltage side unit may be controlled to charge the flying capacitor, so that the voltage of the flying capacitor falls within the target voltage range, and the flying capacitor may be charged without adding the charge loop. Therefore, the hardware costs are reduced, the costs are lower, the system structure is simple, and the applicability is high.

With reference to the second aspect, in a seventh possible implementation, when the three-level converter is in the boost working mode and the flying capacitor is overvoltage, the flying capacitor needs to be controlled to discharge to the high-voltage side unit. When the voltage of the flying capacitor is greater than an upper voltage limit within the target voltage range and the voltage of the flying capacitor is less than that of the low-voltage side unit, the control unit may control the fourth switch to be normally open and control the third switch to be turned on in a first time period and to be turned off in a second time period. Therefore, the flying capacitor may be controlled to discharge to the high-voltage side unit, so that the voltage of the flying capacitor falls within the target voltage range. The first time period may be understood as a time period that falls within a switching period of the third switch and that is earlier than the second time period. When the three-level converter is in the boost working mode and the flying capacitor is overvoltage, drive of the third switch to the fourth switch may be controlled to be unidirectionally increased. Therefore, the flying capacitor may be controlled to discharge to the high-voltage side unit, so that the voltage of the flying capacitor falls within the target voltage range, and the flying capacitor may be controlled to discharge without adding the discharge loop. Therefore, the hardware costs are reduced, the costs are lower, the system structure is simple, and the applicability is high.

With reference to the second aspect, in an eighth possible implementation, when the three-level converter is in the boost working mode and the flying capacitor is overvoltage, the flying capacitor needs to be controlled to discharge to the high-voltage side unit. When the voltage of the flying capacitor is greater than an upper voltage limit within the target voltage range and the voltage of the flying capacitor is greater than that of the low-voltage side unit, the control unit may control the third switch to be normally closed and control the fourth switch to be turned on in a first time period and to be turned off in a second time period. Therefore, the flying capacitor may be controlled to discharge to the high-voltage side unit, so that the voltage of the flying capacitor falls within the target voltage range. The first time period may be understood as a time period that falls within a switching period of the fourth switch and that is earlier than the second time period. When the three-level converter is in the boost working mode and the flying capacitor is overvoltage, the drive of the third switch to the fourth switch may be controlled to be unidirectionally increased. Therefore, the flying capacitor may be controlled to discharge to the high-voltage side unit, so the voltage of the flying capacitor falls within the target voltage range, and the flying capacitor may be controlled to discharge without adding the discharge loop. Therefore, the hardware costs are reduced, the costs are lower, the system structure is simple, and the applicability is high.

According to a third aspect, the embodiments may provide a power supply system. The power supply system includes a battery module and the three-level converter that is connected to the battery module according to any one of the first aspect to the eighth possible implementation of the first aspect. When a voltage of a flying capacitor in the three-level converter falls within a target voltage range, the three-level converter can output three levels and reduce a high-order harmonic in an output voltage of the three-level converter. This can avoid that a switching device in the three-level converter cannot normally work due to a high voltage (that is, the three-level converter can normally work). Therefore, power supply efficiency of a system is improved.

With reference to the third aspect, in a first possible implementation, the power supply system further includes a power supply module and a power conversion module connected to the power supply module. The power supply module herein may include but is not limited to a photovoltaic array and a generator.

With reference to the first possible implementation of the third aspect, in a second possible implementation, in a photovoltaic and energy storage hybrid power supply scenario, the power supply module is the photovoltaic array, and the power conversion module is a direct current DC/DC conversion module.

With reference to the first possible implementation of the third aspect, in a third possible implementation, in a wind and energy storage hybrid power supply scenario, the power supply module is the generator, and the power conversion module is an alternating current AC/DC conversion module.

With reference to any one of the first possible implementation of the third aspect to the third possible implementation of the third aspect, in a fourth possible implementation, in an on-grid/off-grid power supply scenario, the power supply system further includes a direct current bus and a DC/AC conversion module. The three-level converter and the power conversion module are separately connected to an input end of the DC/AC conversion module by using the direct current bus, and an output end of the DC/AC conversion module is connected to an alternating current load or an alternating current power grid.

When the three-level converter is in different working modes, the flying capacitor may be charged or controlled to discharge by triggering different outer transistor switches and inner transistor switches, so that the voltage of the flying capacitor falls within the target voltage range without adding a charge loop or a discharge loop. Therefore, hardware costs are reduced, costs are lower, a system structure is simple, and applicability is high.

DETAILED DESCRIPTION OF THE EMBODIMENTS

A three-level converter may be applied to a plurality of fields, such as a new energy smart microgrid field, a power transmission and distribution field, a new energy field (for example, a grid-connected photovoltaic power generation field or a grid-connected wind power generation field), a photovoltaic energy storage power generation field (for example, supplying power to a household device (for example, a refrigerator or an air conditioner) or a grid), a wind energy storage power generation field, or a high-power converter field (for example, converting a direct current into a high-power high-voltage alternating current). This may be determined depending on an actual application scenario and is not limited herein. A power supply system may be applied to different application scenarios, for example, a photovoltaic energy storage power supply scenario, a wind energy storage power supply scenario, a pure energy storage power supply scenario, or another application scenario. The following uses the energy storage power supply scenario as an example for description, and details are not described below again.

Figure 1:
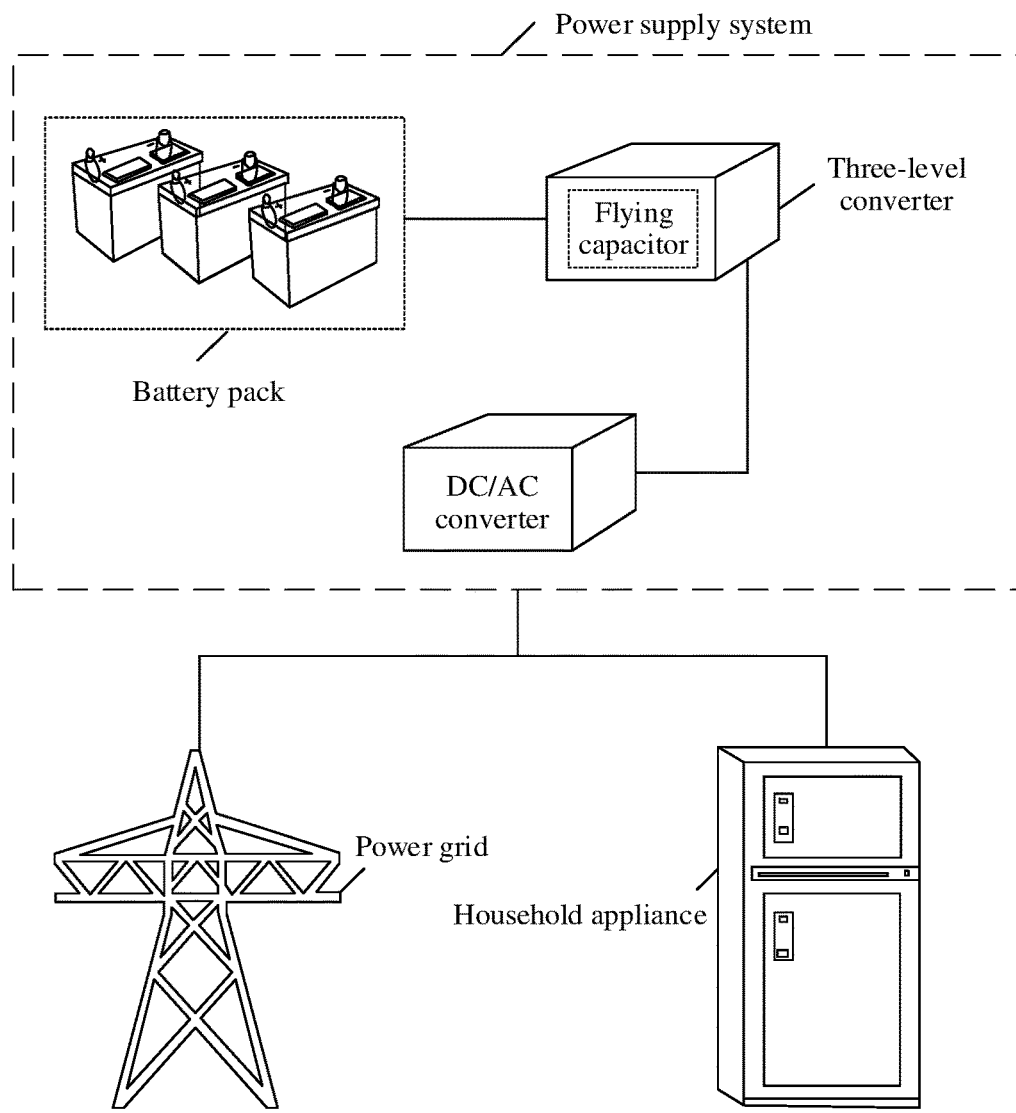
FIG. 1 is a schematic diagram of an application scenario of a three-level converter.

FIG. 1 is a schematic diagram of an application scenario of a three-level converter. In a pure energy storage power supply scenario, as shown in FIG. 1, a power supply system includes a battery pack, a three-level converter, and a DC/AC converter. The battery pack may be connected to the DC/AC converter by using the three-level converter. In a process in which the power supply system supplies power to a load, the three-level converter may output a target direct current voltage to the DC/AC converter based on a direct current voltage provided by the battery pack. In this case, the DC/AC converter may convert the target direct current voltage into an alternating current voltage, and supply power to a power grid and household equipment based on the alternating current voltage. In the scenario shown in FIG. 1, the three-level converter includes a flying capacitor. When a voltage of the flying capacitor falls outside a safe voltage range, a switching device in the three-level converter cannot normally work due to a high voltage. Consequently, the power supply system cannot normally supply the power to the load. Therefore, it is particularly important to control the voltage of the flying capacitor within the safe voltage range.

In this case, a control unit of the three-level converter may control the switching device in the three-level converter to operate until the voltage of the flying capacitor falls within the safe voltage range, to ensure that the power supply system may normally supply the power. A system structure is simpler, costs are lower, efficiency and safety of power supply of the system are further improved, and applicability is higher.

The following describes, as examples, the three-level converter, and the power supply system and working principles thereof with reference to FIG. 2 to FIG. 14.

Figure 2:
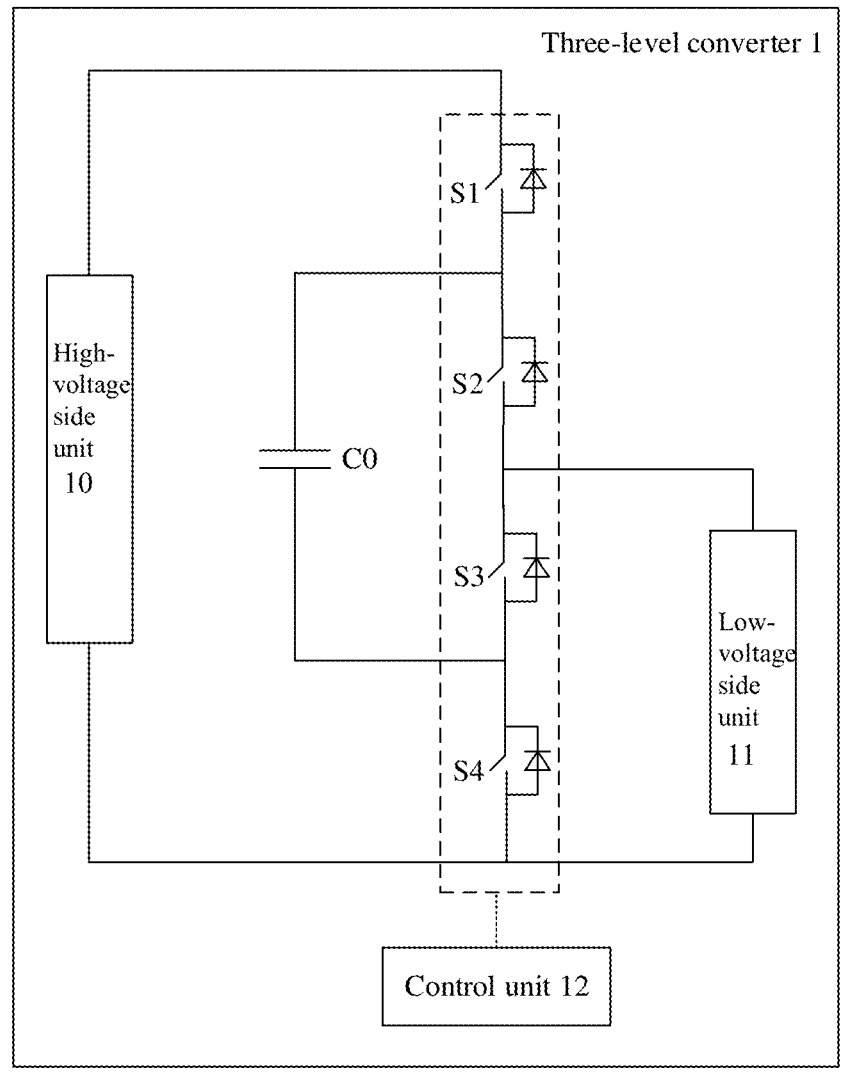
FIG. 2 is a schematic diagram of a structure of a three-level converter.

FIG. 2 is a schematic diagram of a structure of a three-level converter. As shown in FIG. 2, a three-level converter 1 includes a high-voltage side unit 10, a low-voltage side unit 11, a flying capacitor C0, a first switch S1, a second switch S2, a third switch S3, a fourth switch S4, and a control unit 12. The high-voltage side unit 10 may include but is not limited to a capacitor, an inductor, and a switch. A voltage of the high-voltage side unit 10 herein is greater than that of the low-voltage side unit 11. The high-voltage side unit 10 may include but is not limited to a capacitor. The low-voltage side unit 11 may include but is not limited to a capacitor, an inductor, and a battery. For example, the low-voltage side unit 11 may include an inductor and a capacitor that are connected in series, or the low-voltage side unit 11 may include a capacitor, an inductor, and a battery; the inductor is connected in series to the capacitor; and the capacitor is connected in parallel to the battery. This may be determined depending on an actual application scenario and is not limited herein. The first switch S1, the second switch S2, the third switch S3, and the fourth switch S4 may be connected in series and connected in parallel to the high-voltage side unit 10. A series connection point of the first switch S1 and the second switch S2 may be connected to a series connection point of the third switch S3 and the fourth switch S4 by using the flying capacitor C0. The third switch S3 and the fourth switch S4 may be connected in series and connected in parallel to the low-voltage side unit 11. The control unit 12 may be connected to the first switch S1 to the fourth switch S4. Optionally, the control unit 12 may also be wirelessly connected to the first switch S1 to the fourth switch S4. This may be determined depending on the actual application scenario and is not limited herein. The first switch S1, the second switch S2, the third switch S3, or the fourth switch S4 may be made of a silicon (Si) semiconductor material, silicon carbide (SiC) of a third-generation wide bandgap semiconductor material, gallium nitride (GaN), diamond, zinc oxide (ZnO), or an MOSFET, an IGBT, a controllable power switching device, or a diode, either of which is made of another material.

In some feasible implementations, when a voltage of the flying capacitor C0 falls outside a target voltage range (that is, a safe voltage range) and the three-level converter 1 is in a buck working mode, the control unit 12 may control the third switch S3 and the fourth switch S4 to be normally open (in this case, the three-level converter 1 may be simplified as a three-level buck converter), and detect, using a voltage detection circuit (or a voltage detector), the voltage of the flying capacitor C0 and the voltage of the low-voltage side unit 11 in real time. Further, the control unit 12 may control, based on the voltage of the flying capacitor C0 and the voltage of the low-voltage side unit 11, each of the first switch S1 and the second switch S2 to be turned on or off. Therefore, the high-voltage side unit 10 may be controlled to charge the flying capacitor C0 or the flying capacitor C0 may be controlled to discharge to the low-voltage side unit 11, so that the voltage of the flying capacitor C0 falls within the target voltage range (that is, the safe voltage range). The target voltage range may be a voltage range that is greater than a difference between a half-intermediate direct current voltage and a preset deviation and is less than a sum of the half-intermediate direct current voltage and the preset deviation. The half-intermediate direct current voltage may be half of the voltage of the high-voltage side unit 10. The preset deviation herein may be a deviation configured by a user, or a deviation configured by the three-level converter for the flying capacitor, which may be determined depending on the actual application scenario. Details are not described herein. Optionally, when the voltage of the flying capacitor C0 falls outside the target voltage range and the three-level converter 1 is in a boost working mode, the control unit 12 may control the first switch S1 and the second switch S2 to be normally open (in this case, the three-level converter 1 may be simplified as the three-level boost converter), and detect, using the voltage detection circuit (or the voltage detector), the voltage of the flying capacitor C0 and the voltage of the low-voltage side unit 11 in real time. Further, the control unit 12 may control, based on the voltage of the flying capacitor C0 and the voltage of the low-voltage side unit 11, each of the third switch S3 and the fourth switch S4 to be turned on or off. Therefore, the low-voltage side unit 11 may be controlled to charge the flying capacitor C0 or the flying capacitor C0 may be controlled to discharge to the high-voltage side unit 10, so that the voltage of the flying capacitor C0 falls within the target voltage range.

It may be understood that the first switch S1 and the fourth switch S4 may be understood as outer transistor switches, and the second switch S2 and the third switch S3 may be understood as inner transistor switches. When the three-level converter 1 is in different working modes, the control unit 12 may trigger different outer transistor switches and inner transistor switches to charge the flying capacitor C0 or control the flying capacitor C0 to discharge, so that the voltage of the flying capacitor C0 falls within the target voltage range without adding a charge loop or a discharge loop. Therefore, hardware costs are reduced, costs are lower, a system structure is simple, and applicability is high. In addition, in an entire voltage control process, only a current used to control the voltage of the flying capacitor C0 unidirectionally interacts between the high-voltage side unit 10 and the low-voltage side unit 11. Therefore, the control unit 12 may control the voltage of the flying capacitor C0 in a working condition (for example, a charging condition or a discharging condition) that a cross current between the high-voltage side unit 10 and the low-voltage side unit 11 is small, and therefore the applicability is higher.

In some feasible implementations, for ease of description, the following uses an example in which the high-voltage side unit 10 includes a capacitor and the low-voltage side unit 11 includes a capacitor and an inductor. Details are not described below again.

Figure 3:
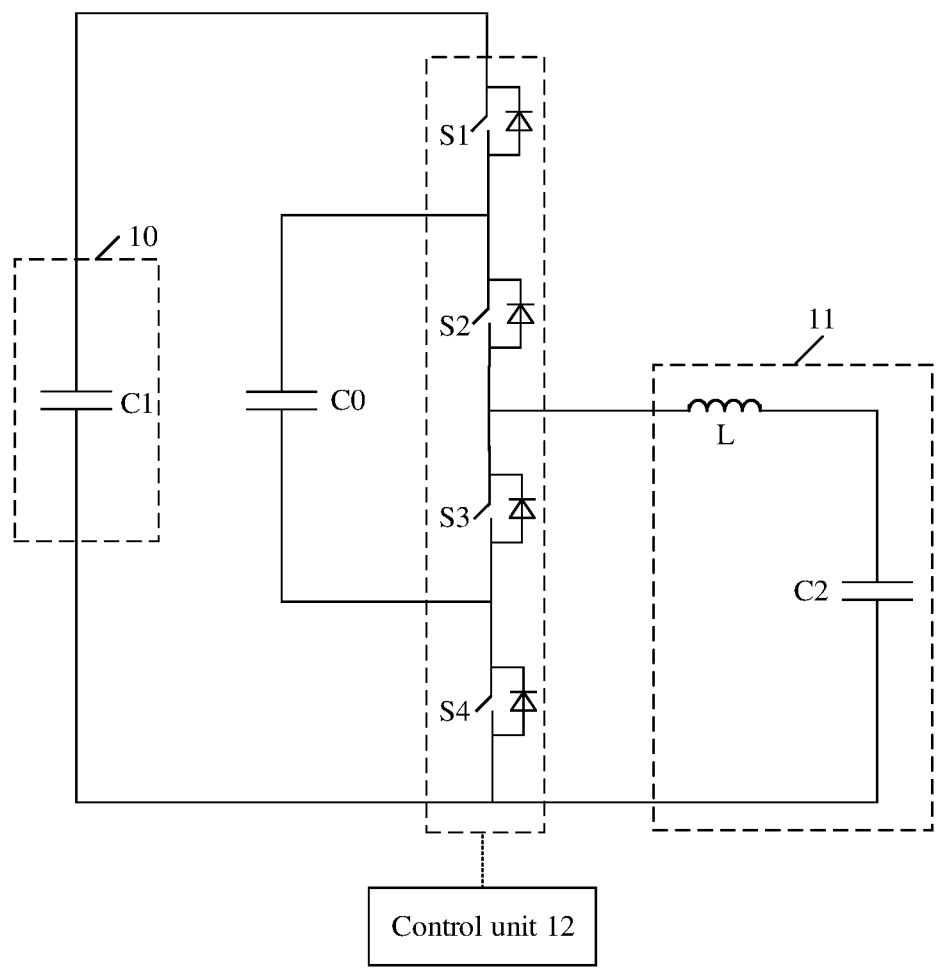
FIG. 3 is a schematic diagram of another structure of a three-level converter.

FIG. 3 is a schematic diagram of another structure of a three-level converter. As shown in FIG. 3, the high-voltage side unit 10 shown in FIG. 2 includes a capacitor C1, and the low-voltage side unit 11 shown in FIG. 2 includes an inductor L and a capacitor C2 that are connected in series. The inductor L and the capacitor C2 may form a filter circuit. The control unit 12 may detect a current of the inductor L in real time by using the current detection circuit (or the current detector), and when the current of the inductor L is less than a preset current value, control the voltage of the flying capacitor C0. The preset current value may be a current value configured by the user or configured by the three-level converter 1. Further, the control unit 12 may detect the voltage of the flying capacitor C0 in real time by using the voltage detection circuit (or the voltage detector), and when the voltage of the flying capacitor C0 falls within the target voltage range, control the first switch S1, the second switch S2, the third switch S3, and the fourth switch S4 to be turned off. In this case, the three-level converter 1 may normally work. On the contrary, when the voltage of the flying capacitor C0 falls outside the target voltage range, the control unit 12 may generate, based on the working mode of the three-level converter 1, the voltage of the flying capacitor C0, a voltage of the capacitor C2, and another parameter, a drive signal (for example, a pulse width modulation signal) of each of the first switch S1, the second switch S2, the third switch S3, and the fourth switch S4. Further, the control unit 12 may control, based on the drive signal of each switch, each switch to be turned on or off, the capacitor C1 to charge the flying capacitor C0, so that the flying capacitor C0 may be controlled to discharge to the capacitor C2, the capacitor C2 may be controlled to charge the flying capacitor C0, or the flying capacitor C0 may be controlled to discharge to the capacitor C1, so that the voltage of the flying capacitor C0 falls within the target voltage range, to implement that the low-voltage side unit 11 (for example, the capacitor C2) or the high-voltage side unit 10 (for example, the capacitor C1) controls the voltage of the flying capacitor C0 by obtaining power or converting current, without adding the charge loop or the discharge loop. Therefore, the hardware costs are reduced, the costs are lower, the system structure is simple, and the applicability is high.

In some feasible implementations, when the three-level converter 1 is in the buck working mode and the flying capacitor C0 is undervoltage, the capacitor C1 needs to be controlled to charge the flying capacitor C0 (that is, the charging condition). The control unit 12 may control the third switch S3 and the fourth switch S4 to be normally open, and when the voltage of the flying capacitor C0 is less than a lower voltage limit within the target voltage range (that is, the flying capacitor C0 is undervoltage, and a voltage of the capacitor C1 is less than the sum of the voltage of the flying capacitor C0 and the voltage of the capacitor C2), and the voltage of the flying capacitor C0 is less than that of the capacitor C2, control the first switch S1 to be normally closed, control the second switch S2 to be turned on in a first time period and to be turned off in a second time period (that is, drive from the first switch S1 to the second switch S2 is unidirectionally increased). Therefore, the capacitor C1 may be controlled to charge the flying capacitor C0, so that the voltage of the flying capacitor C0 falls within the target voltage range. The first time period may be understood as a time period that falls within a switching period of the second switch S2 and that is earlier than the second time period, and a duty cycle of the second switch S2 may be less than or equal to 0.5. The lower voltage limit within the target voltage range herein is a difference between the half-intermediate direct current voltage and the preset deviation.

It may be understood that, when the three-level converter 1 is in the buck working mode and the flying capacitor C0 is undervoltage, the control unit 12 may control the third switch S3 and the fourth switch S4 to be normally open, and control drive from the first switch S1 to the second switch S2 to be unidirectionally increased. Therefore, the capacitor C1 may be controlled to charge the flying capacitor C0, so that the voltage of the flying capacitor C0 falls within the target voltage range, and the flying capacitor C0 may be charged without adding the charge loop. Therefore, the hardware costs are reduced, the costs are lower, the system structure is simple, and the applicability is high.

Optionally, in some feasible implementations, when the three-level converter 1 is in the buck working mode and the flying capacitor C0 is undervoltage, the capacitor C1 needs to be controlled to charge the flying capacitor C0 (that is, the charging condition). The control unit 12 may further control the third switch S3 and the fourth switch S4 to be normally open, and when the voltage of the flying capacitor C0 is less than a lower voltage limit within the target voltage range and the voltage of the flying capacitor C0 is greater than that of the capacitor C2, control the second switch S2 to be normally open, and control the first switch S1 to be turned on in a first time period and to be turned off in a second time period (that is, drive from the first switch S1 to the second switch S2 unidirectionally increased). Therefore, the capacitor C1 may be controlled to charge the flying capacitor C0, so that the voltage of the flying capacitor C0 falls within the target voltage range. The first time period may be understood as a time period that falls within a switching period of the first switch S1 and that is earlier than the second time period, and a duty cycle of the first switch S1 may be less than or equal to 0.5. It may be understood that, when the three-level converter 1 is in the buck working mode and the flying capacitor C0 is undervoltage, the control unit 12 may control the third switch S3 and the fourth switch S4 to be normally open, and control drive from the first switch S1 to the second switch S2 to be unidirectionally increased. Therefore, the capacitor C1 may be controlled to charge the flying capacitor C0, so that the voltage of the flying capacitor C0 falls within the target voltage range, and the flying capacitor C0 may be charged without adding the charge loop. Therefore, the hardware costs are reduced, the costs are lower, the system structure is simple, and the applicability is high.

In some feasible implementations, when the three-level converter 1 is in the buck working mode and the flying capacitor C0 is overvoltage, the flying capacitor C0 needs to be controlled to discharge to the capacitor C2 (that is, a discharge condition). The control unit 12 may control the third switch S3 and the fourth switch S4 to be normally open, and when the voltage of the flying capacitor C0 is greater than an upper voltage limit within the target voltage range (that is, the flying capacitor C0 is overvoltage, and the voltage of the capacitor C1 is greater than the sum of the voltage of the flying capacitor C0 and the voltage of the capacitor C2), and the voltage of the flying capacitor C0 is less than that of the capacitor C2, control the second switch S2 to be normally closed, and control the first switch S1 to be turned on in a first time period and to be turned off in a second time period (that is, drive of the second switch S2 to the first switch S1 is unidirectionally increased). Therefore, the flying capacitor C0 may be controlled to discharge to the capacitor C2, so that the voltage of the flying capacitor C0 falls within the target voltage range. The first time period may be understood as a time period that falls within a switching period of the first switch S1 and that is earlier than the second time period, and the duty cycle of the first switch S1 may be less than or equal to 0.5. The upper voltage limit within the target voltage range herein may be the sum of the half-intermediate direct current voltage and the preset deviation.

It may be understood that, when the three-level converter 1 is in the buck working mode and the flying capacitor C0 is overvoltage, the control unit 12 may control the third switch S3 and the fourth switch S4 to be normally open and control the drive of the first switch S2 to the second switch S1 to be unidirectionally increased. Therefore, the capacitor C2 may be controlled to discharge to the flying capacitor C0, so that the voltage of the flying capacitor C0 falls within the target voltage range, and the flying capacitor C0 may be discharged without adding the discharge loop. Therefore, the hardware costs are reduced, the costs are lower, the system structure is simple, and the applicability is high.

Optionally, in some feasible implementations, when the three-level converter 1 is in the buck working mode and the flying capacitor C0 is overvoltage, the flying capacitor C0 needs to be controlled to discharge to the capacitor C2 (that is, the discharge condition). The control unit 12 may control the third switch S3 and the fourth switch S4 to be normally open, and when the voltage of the flying capacitor C0 is greater than an upper voltage limit within the target voltage range and the voltage of the flying capacitor C0 is greater than that of the capacitor C2, control the first switch S1 to be normally open, and control the second switch S2 to be turned on in a first time period and to be turned off in a second time period. Therefore, the flying capacitor C0 is controlled to discharge to the capacitor C2, so that the voltage of the flying capacitor C0 falls within the target voltage range. The first time period may be understood as a time period that falls within a switching period of the second switch S2 and that is earlier than the second time period, and a duty cycle of the second switch S2 may be less than or equal to 0.5.

It may be understood that, when the three-level converter is in the buck working mode and the flying capacitor C0 is overvoltage, the control unit 12 may control the third switch S3 and the fourth switch S4 to be normally open and control the drive of the first switch S2 to the second switch S1 to be unidirectionally increased. Therefore, the capacitor C2 may be controlled to discharge to the flying capacitor C0, so that the voltage of the flying capacitor C0 falls within the target voltage range, and the flying capacitor C0 may be discharged without adding the discharge loop. Therefore, the hardware costs are reduced, the costs are lower, the system structure is simple, and the applicability is high. It can be understood that, when the three-level converter 1 is in the buck working mode, the third switch S3 and the fourth switch S4 are normally open. In this case, a circuit topology of the three-level converter 1 may be simplified as the three-level buck converter (that is, a unidirectional converter). Therefore, an implementation in which the flying capacitor C0 is charged or controlled to discharge by using the control unit 12 is also applicable to the three-level buck converter. Details are not described herein again.

In some feasible implementations, when the three-level converter 1 is in the boost working mode and the flying capacitor C0 is undervoltage, the capacitor C2 needs to be controlled to charge the flying capacitor C0 (that is, the charging condition). In this case, for a waveform of the drive signal of each of the first switch S1, the second switch S2, the third switch S3, and the fourth switch S4.

Figure 4:
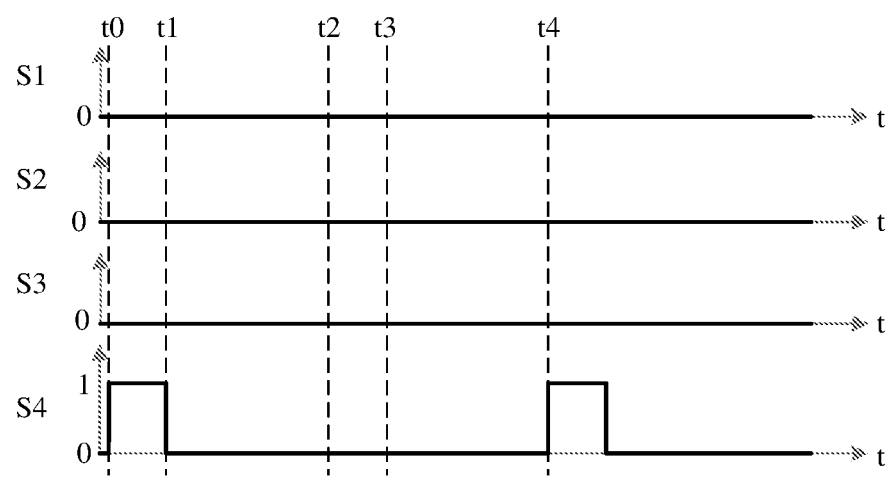
FIG. 4 is a schematic diagram of a switch drive waveform of a three-level converter.

FIG. 4 is a schematic diagram of a switch drive waveform of a three-level converter. As shown in FIG. 4, for ease of description, the following uses one switching period (for example, t0-t4) as an example for description. The control unit 12 may control the first switch S1 and the second switch S2 to be normally open, and when the voltage of the flying capacitor C0 is less than a lower voltage limit within the target voltage range and the voltage of the flying capacitor C0 is less than that of the capacitor C2, control the third switch S3 to be normally open, and control the fourth switch S4 to be turned on in a first time period (for example, t0-t1) and to be turned off in a second time period (for example, t1-t4) (that is, drive from the fourth switch S4 to the third switch S3 is unidirectionally increased). Therefore, the capacitor C2 may be controlled to charge the flying capacitor C0, so that the voltage of the flying capacitor C0 falls within the target voltage range.

Figure 5:
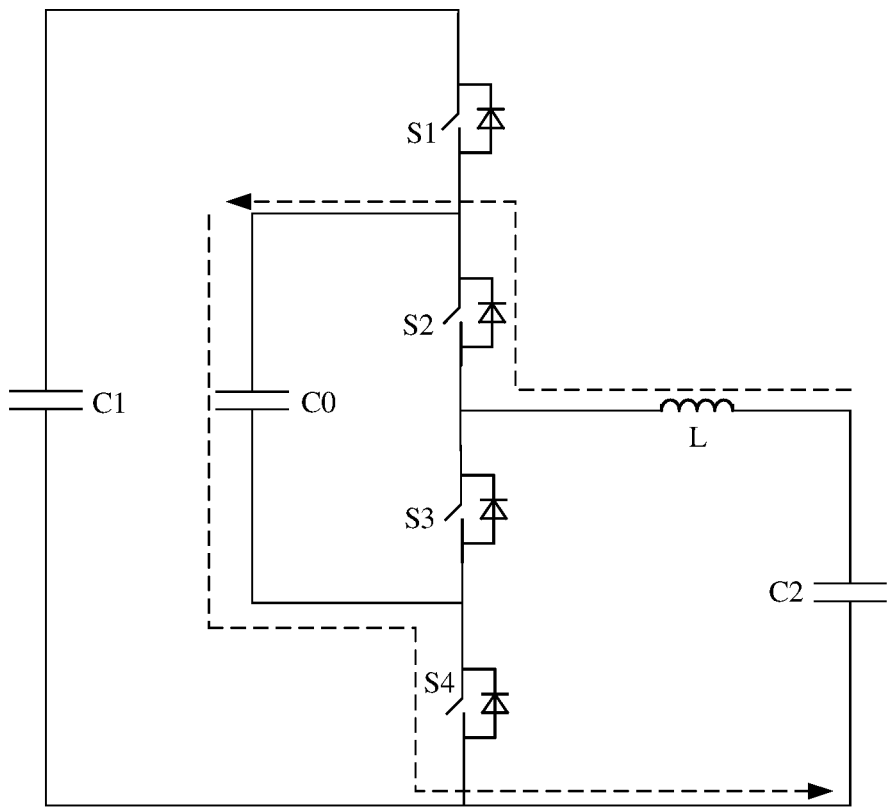
FIG. 5 is a schematic diagram of a current direction of a three-level converter.

In some feasible implementations, in an entire process of charging the flying capacitor C0, for a current direction of the three-level converter 1. FIG. 5 is a schematic diagram of a current direction of a three-level converter. As shown in FIG. 5, the control unit 12 may control the first switch S1, the second switch S2, and the third switch S3 to be normally open, and control the fourth switch S4 to be turned on in a time period t0-t1 and to be turned off in a time period t1-t4. In this case, the capacitor C2, the inductor L, a diode in the second switch S2, the flying capacitor C0, and the fourth switch S4 may form one charge loop. The charge loop may be configured to charge the flying capacitor C0 by using the capacitor C2. It may be understood that, when the three-level converter 1 is in the boost working mode and the flying capacitor C0 is undervoltage, the control unit 12 may control the first switch S1 and the second switch S2 to be normally open, and control drive from the fourth switch S4 to the third switch S3 to be unidirectionally increased. Therefore, the capacitor C2 may be controlled to charge the flying capacitor C0, so that the voltage of the flying capacitor C0 falls within the target voltage range, and the flying capacitor C0 may be charged without adding the charge loop. Therefore, the hardware costs are reduced, the costs are lower, the system structure is simple, and the applicability is high.

Optionally, in some feasible implementations, when the three-level converter 1 is in the boost working mode and the flying capacitor C0 is undervoltage, the capacitor C2 needs to be controlled to charge the flying capacitor C0 (that is, the charging condition). In this case, for a waveform of the drive signal of each of the first switch S1, the second switch S2, the third switch S3, and the fourth switch S4.

Figure 6:
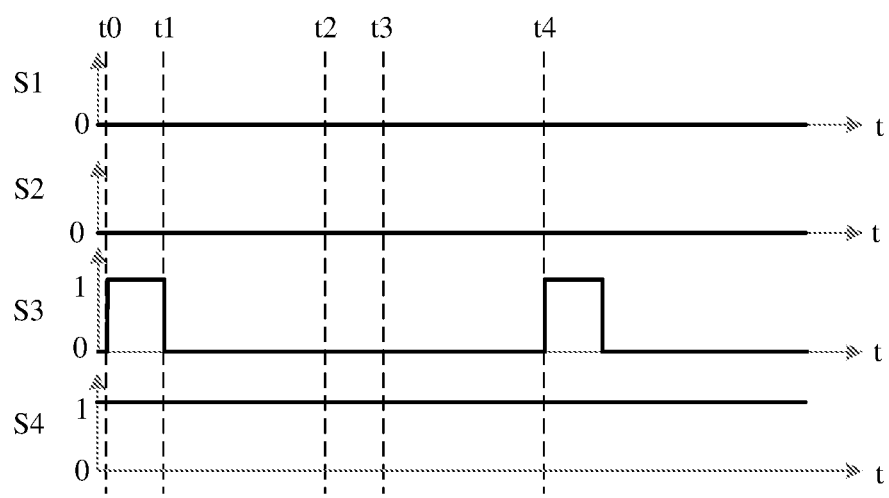
FIG. 6 is a schematic diagram of another switch drive waveform of a three-level converter.

FIG. 6 is a schematic diagram of another switch drive waveform of a three-level converter. As shown in FIG. 6, the control unit 12 may control the first switch S1 and the second switch S2 to be normally open, and when the voltage of the flying capacitor C0 is less than a lower voltage limit within the target voltage range and the voltage of the flying capacitor C0 is greater than that of the capacitor C2, control the fourth switch S4 to be normally on, and control the third switch S3 to be turned on in a first time period (for example, t0-t1) and to be turned off in a second time period (for example, t1-t4) (that is, drive from the fourth switch S4 to the third switch S3 is unidirectionally increased). Therefore, the capacitor C1 can be controlled to charge the inductor L/store energy in the inductor L in the time period t0-t1; after the energy storage is complete, the inductor L may be controlled to charge the flying capacitor C0 in the time period t1-t4, and the capacitor C2 may be controlled to charge the flying capacitor C0, so that the voltage of the flying capacitor C0 falls within the target voltage range. It should be noted that, after the energy storage is complete, because the energy stored in the inductor L is limited, the energy of the inductor L may be decreased to 0 before a time point t4, and the inductor may not continuously charge the flying capacitor C0. For example, after the energy storage is complete, the inductor L may charge the flying capacitor C0 in a time period t1-t2 and stop charging the flying capacitor C0 in a time period t2-t4 (that is, after the energy storage is complete, the energy of the inductor L is 0 at a time point t2). In this case, the control unit 12 may control, in a switching period after the time point t4, the capacitor C2 to charge the flying capacitor C0 until the voltage of the flying capacitor C0 falls within the target voltage range. For details, refer to the implementation in which the flying capacitor C0 is charged by using the capacitor C2 in a switching period t0-t4. Details are not described herein again.

Figure 7:
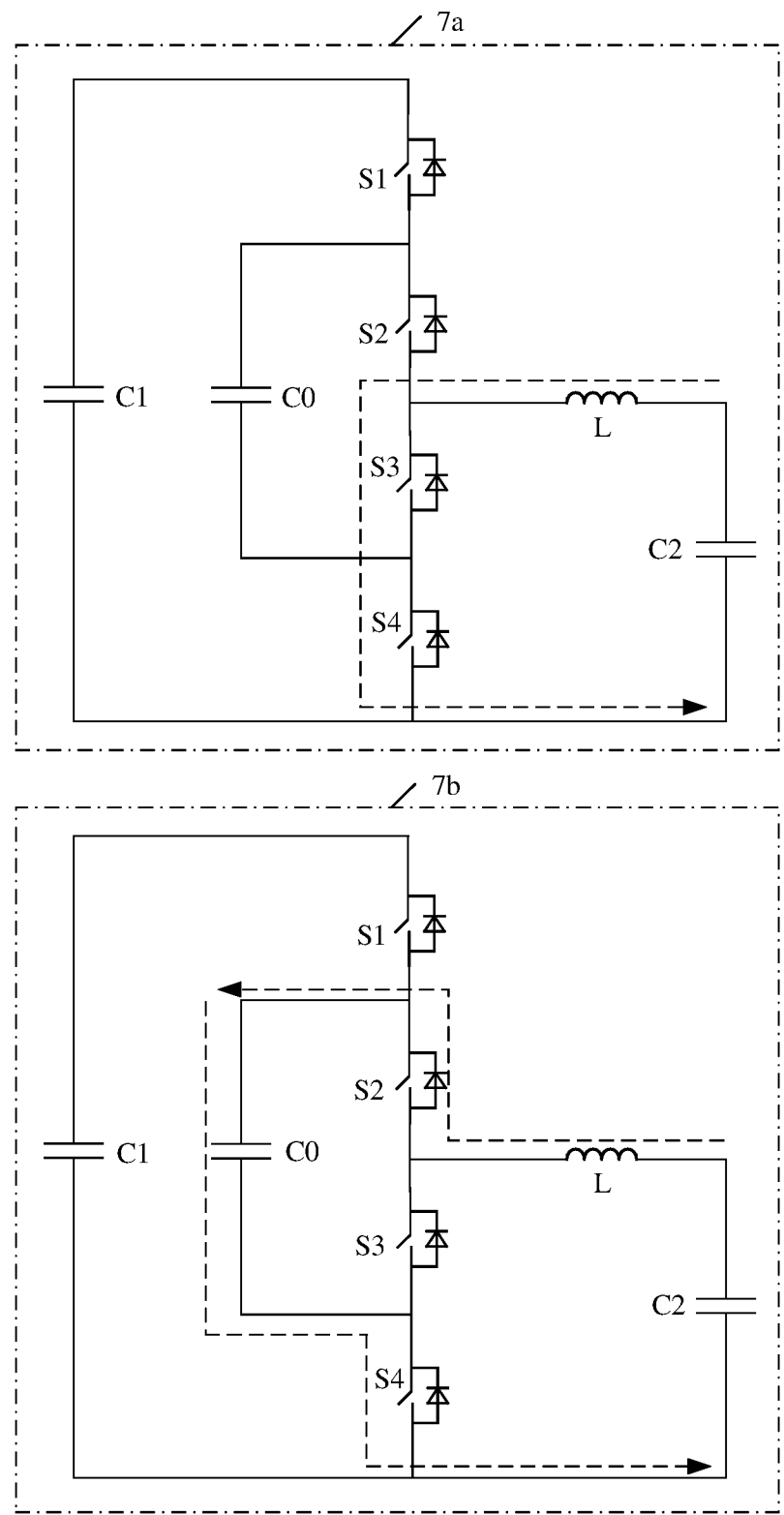
FIG. 7 is a schematic diagram of another current direction of a three-level converter.

In some feasible implementations, in an entire process of charging the flying capacitor C0, for the current direction of the three-level converter 1. FIG. 7 is a schematic diagram of another current direction of a three-level converter. In a time period t0-t1, as shown in 7a in FIG. 7, the control unit 12 may control the first switch S1 and the second switch S2 to be normally open, control the third switch S3 to be turned on in the time period t0-t1, and control the fourth switch S4 to be normally closed. In this case, the capacitor C2, the inductor L, the third switch S3, and the fourth switch S4 may form one charge loop. The charge loop may be configured to charge the inductor L/store energy in the inductor L by using the capacitor C1. In a time period t1-t4, as shown in 7b in FIG. 7, the control unit 12 may control the first switch S1 and the second switch S2 to be normally open, control the third switch S3 to be turned off in the time period t1-t4, and control the fourth switch S4 to be normally on. In this case, the capacitor C2, the inductor L, the diode in the second switch S2, the flying capacitor C0, and the fourth switch S4 may form another charge loop. The charge loop may be configured to charge the flying capacitor C0 by using the inductor L after the energy storage is complete. It may be understood that, when the three-level converter 1 is in the boost working mode and the flying capacitor C0 is undervoltage, the control unit 12 may control the first switch S1 and the second switch S2 to be normally open, and control drive from the fourth switch S4 to the third switch S3 to be unidirectionally increased. Therefore, the capacitor C2 may be controlled to charge the flying capacitor C0, so that the voltage of the flying capacitor C0 falls within the target voltage range, and the flying capacitor C0 may be charged without adding the charge loop. Therefore, the hardware costs are reduced, the costs are lower, the system structure is simple, and the applicability is high.

In some feasible implementations, when the three-level converter 1 is in the boost working mode and the flying capacitor C0 is overvoltage, the flying capacitor C0 needs to be controlled to discharge to the capacitor C1 (that is, the discharging condition). In this case, for the waveform of the drive signal of each of the first switch S1, the second switch S2, the third switch S3, and the fourth switch S4.

Figure 8:
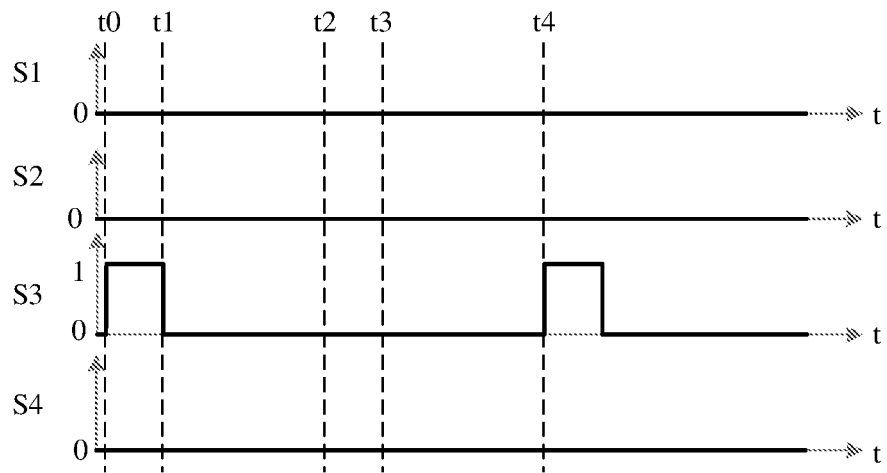
FIG. 8 is a schematic diagram of another switch drive waveform of a three-level converter.

FIG. 8 is a schematic diagram of another switch drive waveform of a three-level converter. As shown in FIG. 8, the control unit 12 may control the first switch S1 and the second switch S2 to be normally open, and when the voltage of the flying capacitor C0 is greater than an upper voltage limit within the target voltage range and the voltage of the flying capacitor C0 is less than that of the capacitor C2, control the fourth switch S4 to be normally open, and control the third switch S3 to be turned on in a first time period (for example, t0-t1) and to be turned off in a second time period (for example, t1-t4) (that is, drive from the third switch S3 to the fourth switch S4 is unidirectionally increased). Therefore, the capacitor C1 may be controlled to discharge to the flying capacitor C0, so that the voltage of the flying capacitor C0 falls within the target voltage range.

Figure 9:
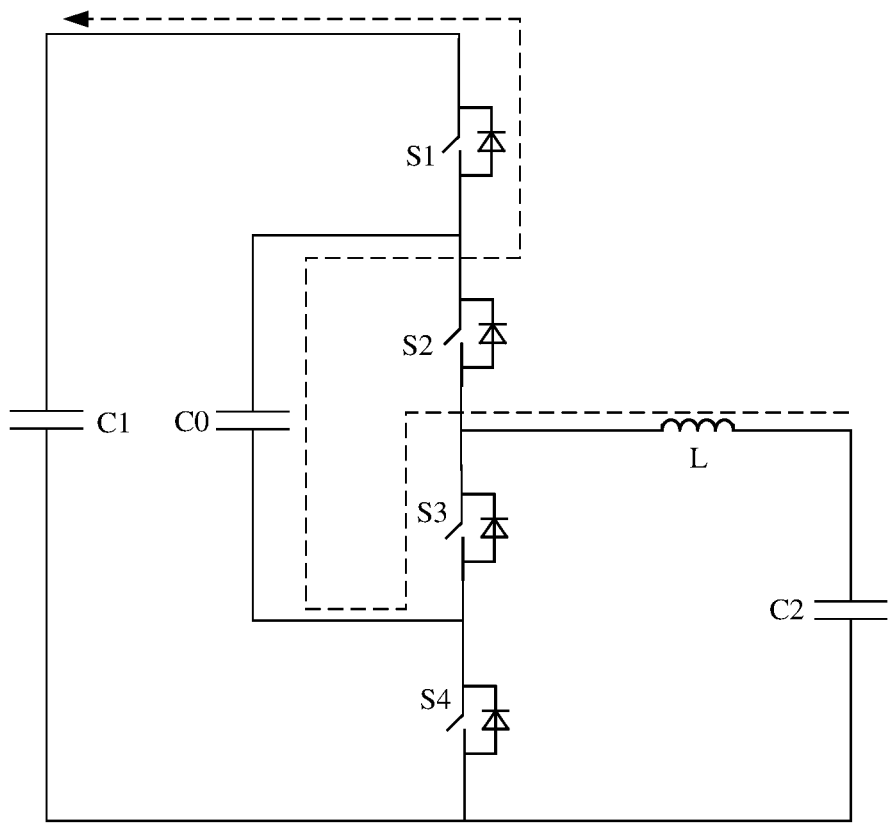
FIG. 9 is a schematic diagram of another current direction of a three-level converter.

In some feasible implementations, in an entire process of discharging the flying capacitor C0, for the current direction of the three-level converter 1. FIG. 9 is a schematic diagram of another current direction of a three-level converter. As shown in FIG. 9, the control unit 12 may control the first switch S1, the second switch S2, and the fourth switch S4 to be normally open, and control the third switch S3 to be turned on in a time period t0-t1 and to be turned off in a time period t1-t4. In this case, the capacitor C1, the capacitor C2, the inductor L, the diode in the first switch S1, the flying capacitor C0, and the third switch S3 may form one discharge loop. The discharge loop may be configured to control the capacitor C2 to discharges to the capacitor C1 by using the flying capacitor C0. It may be understood that, when the three-level converter 1 is in the boost working mode and the flying capacitor C0 is overvoltage, the control unit 12 may control the first switch S1 and the second switch S2 to be normally open, and control drive from the third switch S3 to the fourth switch S4 to be unidirectionally increased. Therefore, the flying capacitor C0 may be controlled to discharge to the capacitor C1, so that the voltage of the flying capacitor C0 falls within the target voltage range, and the flying capacitor C0 may be controlled to discharge without adding the discharge loop. Therefore, the hardware costs are reduced, the costs are lower, the system structure is simple, and the applicability is high.

Optionally, in some feasible implementations, when the three-level converter 1 is in the boost working mode and the flying capacitor C0 is overvoltage, the flying capacitor C0 needs to be controlled to discharge to the capacitor C1 (that is, the discharging condition). In this case, for the waveform of the drive signal of each of the first switch S1, the second switch S2, the third switch S3, and the fourth switch S4.

Figure 10:
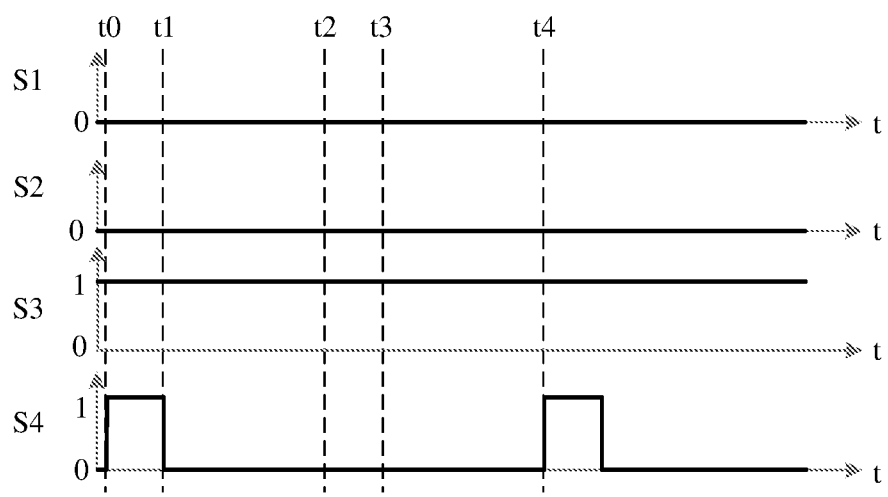
FIG. 10 is a schematic diagram of still another switch drive waveform of a three-level converter.

FIG. 10 is a schematic diagram of another switch drive waveform of a three-level converter. As shown in FIG. 10, the control unit 12 may control the first switch S1 and the second switch S2 to be normally open, and when the voltage of the flying capacitor C0 is greater than an upper voltage limit within the target voltage range and the voltage of the flying capacitor C0 is greater than that of the capacitor C2, control the third switch S3 to be normally closed, and control the fourth switch S4 to be turned on in a first time period (for example, t0-t1) and to be turned off in a second time period (for example, t1-t4) (that is, drive from the third switch S3 to the fourth switch S4 is unidirectionally increased). Therefore, the capacitor can be controlled to charge the inductor in the time period t0-t1/store the energy in the inductor; after the energy storage is complete, the inductor may be controlled to discharge to the capacitor by using the flying capacitor in the time period t1-t4, and the flying capacitor C0 may be controlled to discharge to the capacitor C1, so that the voltage of the flying capacitor C0 falls within the target voltage range. It should be noted that, after the energy storage is complete, because the energy stored in the inductor L is limited, the energy of the inductor L may be decreased to 0 before a time point t4, and the inductor may not continuously discharge to the capacitor C1 by using the flying capacitor C0. For example, after energy storage is complete, the inductor L may discharge to the capacitor C1 by using the flying capacitor C0 in a time period t1-t2, and stops discharging to the capacitor C1 by using the flying capacitor C0 in a time period t2-t4 (that is, after energy storage is complete, the energy of the inductor L is 0 at the time point t2). In this case, the control unit 12 may control, in a switching period after the time point t4, the flying capacitor C0 to discharge to the capacitor C1 until the voltage of the flying capacitor C0 falls within the target voltage range. For details, refer to the implementation in which the flying capacitor C0 discharges to the capacitor C1 in a switching period t0-t4. Details are not described herein again.

Figure 11:
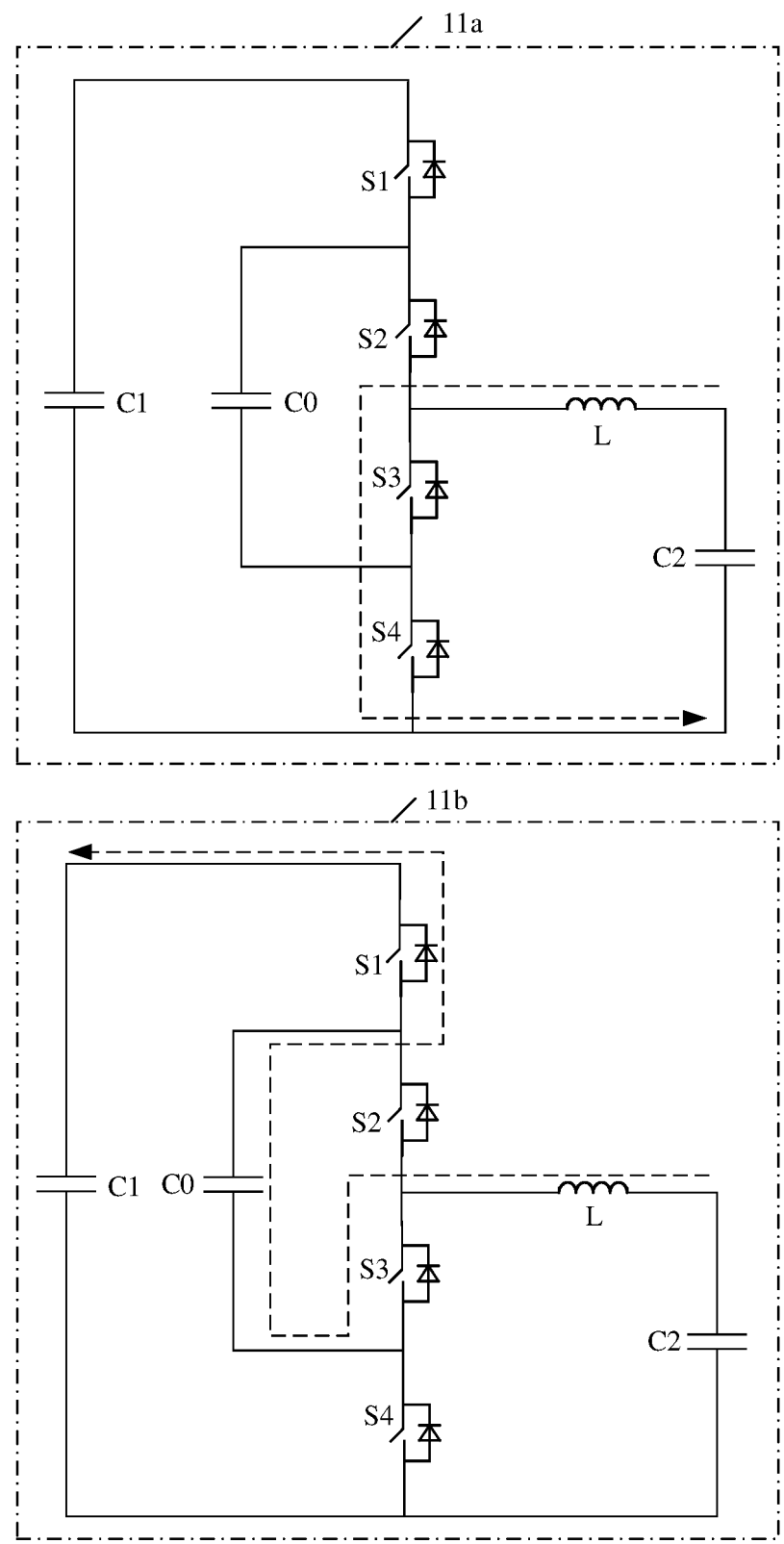
FIG. 11 is a schematic diagram of still another current direction of a three-level converter.

In some feasible implementations, in an entire process of discharging the flying capacitor C0, for the current direction of the three-level converter 1. FIG. 11 is a schematic diagram of another current direction of a three-level converter. In a time period t0-t1, as shown in 11a in FIG. 11, the control unit 12 may control the first switch S1 and the second switch S2 to be normally open, control the third switch S3 to be normally on, and control the fourth switch S4 to be turned on in the time period t0-t1. In this case, the capacitor C2, the inductor L, the third switch S3, and the fourth switch S4 may form one charge loop. The charge loop may be configured to charge the inductor L/store the energy in the inductor L by using the capacitor C1. In a time period t1-t4, as shown in 11b in FIG. 11, the control unit 12 may control the first switch S1 and the second switch S2 to be normally open, control the third switch S3 to be normally on, and control the fourth switch S4 to be turned off in the time period t1-t4. In this case, the capacitor C1, the capacitor C2, the inductor L, the diode in the first switch S1, the flying capacitor C0, and the third switch S3 may form one discharge loop. The discharge loop may be configured to implement that the inductor L discharges to the capacitor C1 by using the flying capacitor C0 after the energy storage is complete. It may be understood that, when the three-level converter 1 is in the boost working mode and the flying capacitor C0 is overvoltage, the control unit 12 may control the first switch S1 and the second switch S2 to be normally open, and control drive from the third switch S3 to the fourth switch S4 to be unidirectionally increased. Therefore, the flying capacitor C0 may be controlled to discharge to the capacitor C1, so that the voltage of the flying capacitor C0 falls within the target voltage range, and the flying capacitor C0 may be controlled to discharge without adding the discharge loop. Therefore, the hardware costs are reduced, the costs are lower, the system structure is simple, and the applicability is high. It can be understood that, when the three-level converter 1 is in the boost working mode, the first switch S1 and the second switch S2 are normally open. In this case, the circuit topology of the three-level converter 1 may be simplified as the three-level boost converter (that is, the unidirectional converter). Therefore, the implementation in which the control unit 12 controls the flying capacitor C0 to charge or discharge is also applicable to the three-level boost converter. Details are not described herein again.

Figure 12:
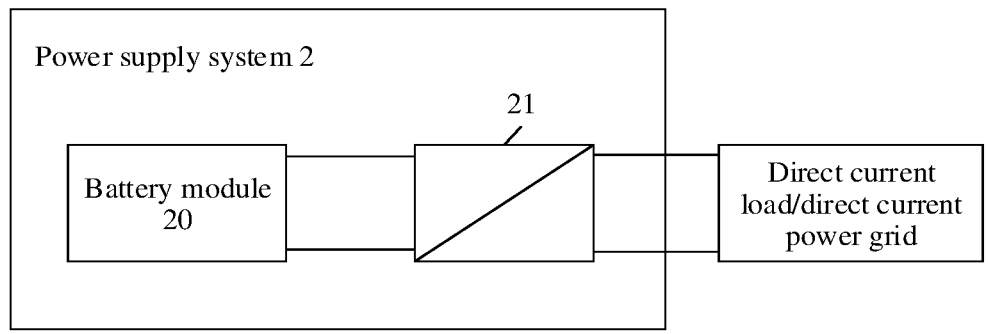
FIG. 12 is a schematic diagram of a structure of a power supply system.

FIG. 12 is a schematic diagram of a structure of a power supply system. In the pure energy storage power supply scenario, as shown in FIG. 12, a power supply system 2 includes a battery module 20 and an input end of a three-level converter 21 (for example, the three-level converter 1 shown in FIG. 2 to FIG. 11). An output end of the three-level converter 21 may be connected to a direct current load or a direct current power grid. The battery module 20 may be formed by connecting a plurality of battery packs in series or in parallel. One battery pack may be formed by connecting one or more battery cells (a voltage of the battery cell is usually between 2.5 V and 4.2 V) in series or in parallel, to form a minimum energy storage and management unit. Optionally, the power supply system 2 further includes a power generation component (not shown in the figure). The power generation component may generate electricity and store the electricity in the battery module 20. The power generation component may include but is not limited to a solar power generation component, a wind power generation component, a hydrogen power generation component, and a diesel generator power generation component. When the voltage of the flying capacitor in the three-level converter 21 falls within the target voltage range, the three-level converter 21 may output three levels and reduce a high-order harmonic wave in the output voltage of the three-level converter 21. This can avoid that a switching device in the three-level converter 21 cannot normally work due to a high voltage, in other words, the three-level converter 21 can normally work. In this case, the three-level converter 21 may convert a direct current voltage provided by the battery module 20 into a target direct current voltage, and supply, based on the target direct current voltage, power to the direct current load or the direct current power grid, to improve power supply efficiency and safety of a system.

Figure 13:
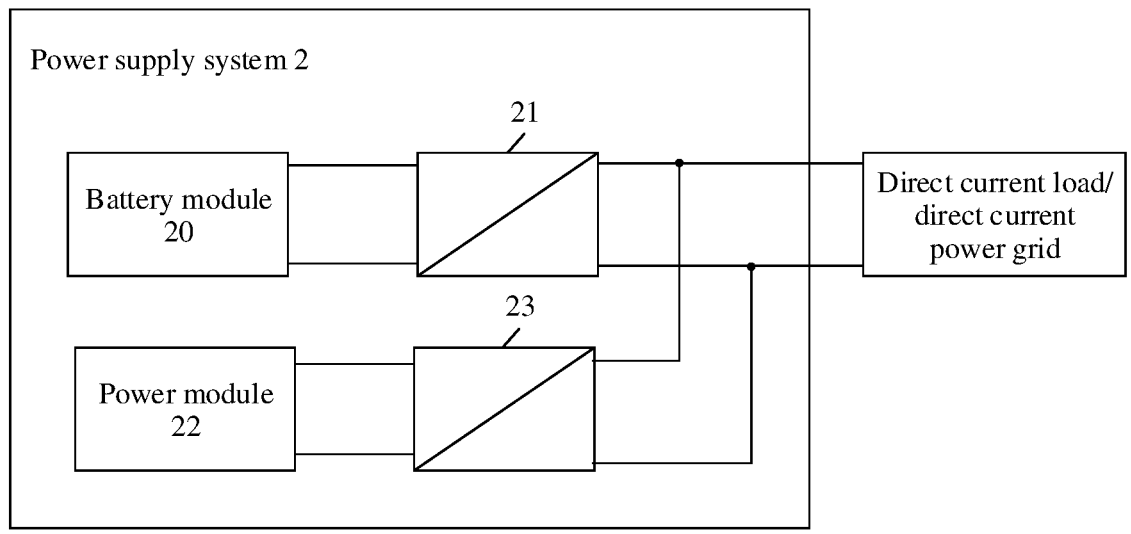
FIG. 13 is a schematic diagram of another structure of a power supply system.

FIG. 13 is a schematic diagram of another structure of a power supply system. As shown in FIG. 13, the power supply system 2 shown in FIG. 12 further includes a power supply module 22 and a power conversion module 23 connected to the power supply module 22. The power supply module 22 herein may include but is not limited to a photovoltaic array and a generator. In a photovoltaic and energy storage hybrid power supply scenario, the power supply module 22 is the photovoltaic array, and the power conversion module 23 is a direct current (direct current, DC)/DC conversion module. The photovoltaic array may be formed by connecting a plurality of photovoltaic strings in series or in parallel. One photovoltaic string may include a plurality of photovoltaic modules (which may also be referred to as solar panels or photovoltaic panels). When the three-level converter 21 works normally, the three-level converter 21 may supply, based on the direct current voltage provided by the battery module 20, the power to the direct current load or the direct current power grid, and the DC/DC conversion module may supply, based on the direct current voltage provided by the photovoltaic array, the power to the direct current load or the direct current power grid, to further improve the power supply efficiency of the system. In a wind and energy storage hybrid power supply scenario, the power supply module 22 is the generator, and the power conversion module 23 is an alternating current (alternating current, AC)/DC conversion module. When the three-level converter 21 works normally, the three-level converter 21 may supply, based on the direct current voltage provided by the battery module 20, the power to the direct current load or the direct current power grid, and the AC/DC conversion module may supply, based on the alternating current voltage provided by the generator, the power to the direct current load or the direct current power grid, to further improve the power supply efficiency of the system.

Figure 14:
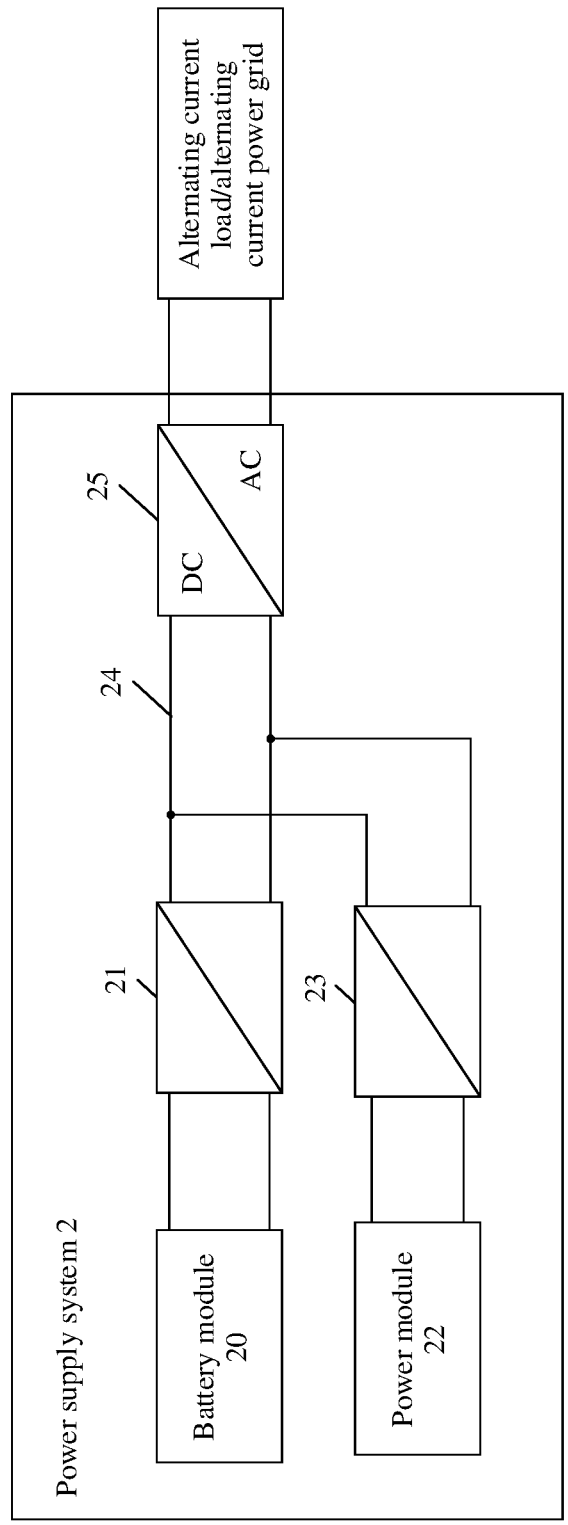
FIG. 14 is a schematic diagram of still another structure of a power supply system.

FIG. 14 is a schematic diagram of another structure of a power supply system. In an on-grid/off-grid power supply scenario, as shown in FIG. 14, the power supply system 2 shown in FIG. 13 further includes a direct current bus 24 and a DC/AC conversion module 25. The three-level converter 21 and the power conversion module 23 may be separately connected to an input end of the DC/AC conversion module 25 by using the direct current bus 24, and an output end of the DC/AC conversion module 25 may be connected to an alternating current load or an alternating current power grid. When the three-level converter 21 works normally, the three-level converter 21 may input, based on the direct current voltage provided by the battery module 20, a direct current voltage to the DC/AC conversion module 25, and the power conversion module 23 may input, based on a direct current voltage or an alternating current voltage provided by the power supply module 22, the direct current voltage to the DC/AC conversion module 25. In this case, the DC/AC conversion module 25 may convert the direct current voltage input by the three-level converter 21 and the direct current voltage input by the power conversion module 23 into an alternating current voltage, and supply, based on the alternating current voltage, the power to the alternating current load or the alternating current power grid. Therefore, the power supply efficiency and applicability of the system is higher.

Figure 15:
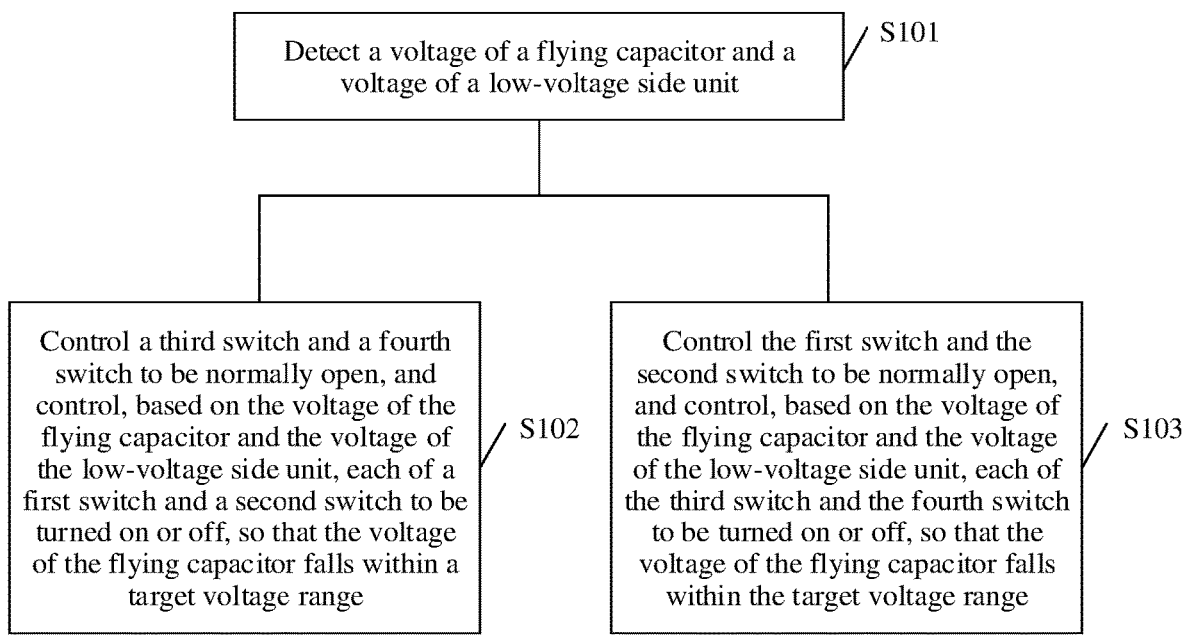
FIG. 15 is a schematic flowchart of a control method of a three-level converter.

FIG. 15 is a schematic flowchart of a control method of a three-level converter. The method is applicable to a control unit in a three-level converter (for example, the three-level converter 1 provided in FIG. 2 to FIG. 11). The three-level converter may further include a high-voltage side unit, a low-voltage side unit, a flying capacitor, a first switch, a second switch, a third switch, and a fourth switch. The first switch, the second switch, the third switch, and the fourth switch are connected in series and connected in parallel to the high-voltage side unit; a series connection point of the first switch and the second switch is connected to a series connection point of the third switch and the fourth switch by using the flying capacitor; and the third switch and the fourth switch are connected in series and connected in parallel to the low-voltage side unit. As shown in FIG. 15, the method includes the following steps S101 to S103.

Step S101: Detect a voltage of the flying capacitor and a voltage of the low-voltage side unit.

In some feasible implementations, the control unit may detect, using a voltage detection circuit (or a voltage detector), the voltage of the flying capacitor and the voltage of the low-voltage side unit.

Step S102: Control the third switch and the fourth switch to be normally open, and control, based on the voltage of the flying capacitor and the voltage of the low-voltage side unit, each of the first switch and the second switch to be turned on or off, so that the voltage of the flying capacitor falls within the target voltage range.

In some feasible implementations, when a voltage of the flying capacitor falls outside the target voltage range (that is, a safe voltage range) and the three-level converter is in a buck working mode, the control unit may be configured to control the third switch and the fourth switch to be normally open, and control, based on the voltage of the flying capacitor and the voltage of the low-voltage side unit, the first switch and the second switch to be turned on or off. Therefore, the high-voltage side unit may be controlled to charge the flying capacitor or may be controlled to discharge to the low-voltage side unit, so that the voltage of the flying capacitor falls within the target voltage range (that is, the safe voltage range). It may be understood that, when the three-level converter is in the buck working mode, the control unit may trigger the first switch and the second switch to charge the flying capacitor or control the flying capacitor to discharge, so that the voltage of the flying capacitor falls within the target voltage range without adding a charge loop or a discharge loop. Therefore, hardware costs are reduced, costs are lower, a system structure is simple, and applicability is high.

In some feasible implementations, when the three-level converter is in the buck working mode and the flying capacitor is undervoltage, the high-voltage side unit needs to be controlled to charge the flying capacitor. When the voltage of the flying capacitor is less than a lower voltage limit within a target voltage range (that is, the flying capacitor is undervoltage) and the voltage of the flying capacitor is less than that of the low-voltage side unit, the control unit may control the first switch to be normally closed, and control the second switch to be turned on in a first time period and to be turned off in a second time period (drive from the first switch to the second switch is unidirectionally increased). Therefore, the high-voltage side unit may be controlled to charge the flying capacitor, so that the voltage of the flying capacitor falls within the target voltage range. The first time period may be understood as a time period that falls within a switching period of the second switch and that is earlier than the second time period. It may be understood that, when the three-level converter is in the buck working mode and the flying capacitor is undervoltage, the control unit may unidirectionally increase drive from the first switch to the second switch. Therefore, the high-voltage side unit may be controlled to charge the flying capacitor, so that the voltage of the flying capacitor falls within the target voltage range, and the flying capacitor may be charged without adding the charge loop. Therefore, the hardware costs are reduced, the costs are lower, the system structure is simple, and the applicability is high.

In some feasible implementations, when the three-level converter is in the buck working mode and the flying capacitor is undervoltage, the high-voltage side unit needs to be controlled to charge the flying capacitor. When the voltage of the flying capacitor is less than a lower voltage limit within the target voltage range and the voltage of the flying capacitor is greater than that of the low-voltage side unit, the control unit may control the second switch to be normally open, and control the first switch to be turned on in a first time period and to be turned off in a second time period (that is, drive from the first switch to the second switch is unidirectionally increased). Therefore, the high-voltage side unit may be controlled to charge the flying capacitor, so that the voltage of the flying capacitor falls within the target voltage range. The first time period may be understood as a time period that falls within a switching period of the first switch and that is earlier than the second time period. It may be understood that, when the three-level converter is in the buck working mode and the flying capacitor is undervoltage, the control unit may unidirectionally increase drive from the first switch to the second switch. Therefore, the high-voltage side unit may be controlled to charge the flying capacitor, so that the voltage of the flying capacitor falls within the target voltage range, and the flying capacitor may be charged without adding the charge loop. Therefore, the hardware costs are reduced, the costs are lower, the system structure is simple, and the applicability is high.

In some feasible implementations, when the three-level converter is in the buck working mode and the flying capacitor is overvoltage, the flying capacitor needs to be controlled to discharge to the low-voltage side unit. When the voltage of the flying capacitor is greater than an upper voltage limit within the target voltage range (that is, the flying capacitor is overvoltage) and the voltage of the flying capacitor is less than that of the low-voltage side unit, the control unit may control the second switch to be normally closed, and control the first switch to be turned on in a first time period and to be turned off in a second time period. Therefore, the flying capacitor may be controlled to discharge to the low-voltage side unit, so that the voltage of the flying capacitor falls within the target voltage range. The first time period may be understood as a time period that falls within a switching period of the first switch and that is earlier than the second time period. It may be understood that, when the three-level converter is in the buck working mode and the flying capacitor is overvoltage, drive from the second switch to the first switch may be controlled to be unidirectionally increased. Therefore, the flying capacitor may be controlled to discharge to the low-voltage side unit, so that the voltage of the flying capacitor falls within the target voltage range, and the flying capacitor may be controlled to discharge without adding the discharge loop. Therefore, the hardware costs are reduced, the costs are lower, the system structure is simple, and the applicability is high.

In some feasible implementations, when the three-level converter is in the buck working mode and the flying capacitor is overvoltage, the flying capacitor needs to be controlled to discharge to the low-voltage side unit. When the voltage of the flying capacitor is greater than an upper voltage limit within the target voltage range and the voltage of the flying capacitor is greater than that of the low-voltage side unit, the control unit may control the first switch to be normally open and control the second switch to be turned on in a first time period and to be turned off in a second time period. Therefore, the flying capacitor may be controlled to discharge to the low-voltage side unit, so that the voltage of the flying capacitor falls within the target voltage range. The first time period may be understood as a time period that falls within a switching period of the second switch and that is earlier than the second time period. It may be understood that, when the three-level converter is in the buck working mode and the flying capacitor is overvoltage, drive from the second switch to the first switch may be controlled to be unidirectionally increased. Therefore, the flying capacitor may be controlled to discharge to the low-voltage side unit, so that the voltage of the flying capacitor falls within the target voltage range, and the flying capacitor may be controlled to discharge without adding the discharge loop. Therefore, the hardware costs are reduced, the costs are lower, the system structure is simple, and the applicability is high.

Step S103: Control the first switch and the second switch to be normally open, and control, based on the voltage of the flying capacitor and the voltage of the low-voltage side unit, each of the third switch and the fourth switch to be turned on or off, so that the voltage of the flying capacitor falls within the target voltage range.

In some feasible implementations, when a voltage of the flying capacitor falls outside a target voltage range and the three-level converter is in a boost working mode, the control unit may control the first switch and the second switch to be normally open, and control, based on the voltage of the flying capacitor and the voltage of the low-voltage side unit, the third switch and the fourth switch to be turned on or off. Therefore, the low-voltage side unit may be controlled to charge the flying capacitor or the flying capacitor may be controlled to discharge to the high-voltage side unit, so that the voltage of the flying capacitor falls within the target voltage range. It may be understood that, when the three-level converter is in the boost working mode, the control unit may trigger the third switch and the fourth switch to charge or control the flying capacitor to discharge, so that the voltage of the flying capacitor falls within the target voltage range without adding the charge loop or the discharge loop. Therefore, the hardware costs are reduced, the costs are lower, the system structure is simple, and the applicability is high.

In some feasible implementations, when the three-level converter is in the boost working mode and the flying capacitor is undervoltage, the low-voltage side unit needs to be controlled to charge the flying capacitor. When the voltage of the flying capacitor is less than a lower voltage limit within the target voltage range and the voltage of the flying capacitor is less than that of the low-voltage side unit, the control unit may control the third switch to be normally open and control the fourth switch to be turned on in a first time period and to be turned off in a second time period. Therefore, the low-voltage side unit may be controlled to charge the flying capacitor, so that the voltage of the flying capacitor falls within the target voltage range. The first time period may be understood as a time period that falls within a switching period of the fourth switch and that is earlier than the second time period. It may be understood that, when the three-level converter is in the boost working mode and the flying capacitor is undervoltage, the control unit may unidirectionally increase drive from the fourth switch to the third switch. Therefore, the low-voltage side unit may be controlled to charge the flying capacitor, so that the voltage of the flying capacitor falls within the target voltage range, and the flying capacitor may be charged without adding the charge loop. Therefore, the hardware costs are reduced, the costs are lower, the system structure is simple, and the applicability is high.

In some feasible implementations, when the three-level converter is in the boost working mode and the flying capacitor is undervoltage, the low-voltage side unit needs to be controlled to charge the flying capacitor. When the voltage of the flying capacitor is less than a lower voltage limit within the target voltage range and the voltage of the flying capacitor is greater than that of the low-voltage side unit, the control unit may control the fourth switch to be normally closed and control the third switch to be turned on in a first time period and to be turned off in a second time period. Therefore, the low-voltage side unit may be controlled to charge the flying capacitor, so that the voltage of the flying capacitor falls within the target voltage range. The first time period may be understood as a time period that falls within a switching period of the third switch and that is earlier than the second time period. It may be understood that, when the three-level converter is in the boost working mode and the flying capacitor is undervoltage, the control unit may unidirectionally increase drive from the fourth switch to the third switch. Therefore, the low-voltage side unit may be controlled to charge the flying capacitor, so that the voltage of the flying capacitor falls within the target voltage range, and the flying capacitor may be charged without adding the charge loop. Therefore, the hardware costs are reduced, the costs are lower, the system structure is simple, and the applicability is high.

In some feasible implementations, when the three-level converter is in the boost working mode and the flying capacitor is overvoltage, the flying capacitor needs to be controlled to discharge to the high-voltage side unit. When the voltage of the flying capacitor is greater than an upper voltage limit within the target voltage range and the voltage of the flying capacitor is less than that of the low-voltage side unit, the control unit may control the fourth switch to be normally open and control the third switch to be turned on in a first time period and to be turned off in a second time period. Therefore, the flying capacitor may be controlled to discharge to the high-voltage side unit, so that the voltage of the flying capacitor falls within the target voltage range. The first time period may be understood as a time period that falls within a switching period of the third switch and that is earlier than the second time period. It may be understood that, when the three-level converter is in the boost working mode and the flying capacitor is overvoltage, the control unit may unidirectionally increase drive from the third switch to the fourth switch. Therefore, the flying capacitor may be controlled to discharge to the high-voltage side unit, so that the voltage of the flying capacitor falls within the target voltage range, and the flying capacitor may be controlled to discharge without adding the discharge loop. Therefore, the hardware costs are reduced, the costs are lower, the system structure is simple, and the applicability is high.

In some feasible implementations, when the three-level converter is in the boost working mode and the flying capacitor is overvoltage, the flying capacitor needs to be controlled to discharge to the high-voltage side unit. When the voltage of the flying capacitor is greater than an upper voltage limit within the target voltage range and the voltage of the flying capacitor is greater than that of the low-voltage side unit, the control unit may control the third switch to be normally closed, and control the fourth switch to be turned on in a first time period and to be turned off in a second time period. Therefore, the flying capacitor may be controlled to discharge to the high-voltage side unit, so that the voltage of the flying capacitor falls within the target voltage range. The first time period may be understood as a time period that falls within a switching period of the fourth switch and that is earlier than the second time period. It may be understood that, when the three-level converter is in the boost working mode and the flying capacitor is overvoltage, the control unit may unidirectionally increase drive from the third switch to the fourth switch. Therefore, the flying capacitor may be controlled to discharge to the high-voltage side unit, so that the voltage of the flying capacitor falls within the target voltage range, and the flying capacitor may be controlled to discharge without adding the discharge loop. Therefore, the hardware costs are reduced, the costs are lower, the system structure is simple, and the applicability is high.

In implementation, for more operations performed by the control unit in the control method of the three-level converter, refer to the implementations performed by the control unit in the three-level converter and the working principles thereof shown in FIG. 2 to FIG. 11. Details are not described herein again.

When the three-level converter is in different working modes, the flying capacitor may be charged or controlled to discharge by triggering different outer transistor switches and inner transistor switches, so that the voltage of the flying capacitor falls within the target voltage range without adding a charge loop or a discharge loop. Therefore, the hardware costs are reduced, the costs are lower, the system structure is simple, and the applicability is high.

The foregoing descriptions are merely implementations of embodiments, but are not intended to limit the scope of the embodiments. Any variation or replacement readily figured out by a person skilled in the art shall fall within the scope of the embodiments.

What is claimed is:

1. A three-level converter, comprising:
   a high-voltage side unit;
   a low-voltage side unit;
   a flying capacitor;
   a first switch;
   a second switch;
   a third switch;
   a fourth switch; and
   a control unit, wherein the first switch, the second switch, the third switch, and the fourth switch are connected in series and connected in parallel to the high-voltage side unit; a series connection point of the first switch and the second switch is connected to a series connection point of the third switch and the fourth switch by using the flying capacitor; the third switch and the fourth switch are connected in series and connected in parallel to the low-voltage side unit;
   the control unit controls, when a voltage of the flying capacitor falls outside a target voltage range, the third switch and the fourth switch to be normally open in a first state, and controls, based on a voltage of the flying capacitor and a voltage of the low-voltage side unit, each of the first switch and the second switch to be turned on or off, so that the voltage of the flying capacitor falls within the target voltage range; or the control unit further controls, when the voltage of the flying capacitor falls outside the target voltage range, the first switch and the second switch to be normally open in the first state, and controls, based on a voltage of the flying capacitor and a voltage of the low-voltage side unit, each of the third switch and the fourth switch to be turned on or off, so that the voltage of the flying capacitor falls within the target voltage range, wherein the target voltage range is a voltage range that is greater than a difference between a half-intermediate direct current voltage and a preset deviation and is less than a sum of the half-intermediate direct current voltage and the preset deviation, and the half-intermediate direct current voltage is half of the voltage of the high-voltage side unit.

2. The three-level converter according to claim 1, wherein the control unit further:

transitions from the first state to the at least one second state when the voltage of the flying capacitor is less than a lower voltage limit within the target voltage range and the voltage of the flying capacitor is less than that of the low-voltage side unit, by controlling the first switch to be normally closed and controlling the second switch to be turned on in a first time period and to be turned off in a second time period, wherein the first time period is a time period that falls within a switching period of the second switch and that is earlier than the second time period.

3. The three-level converter according to claim 1, wherein the control unit further:

transitions from the first state to the at least one second state when the voltage of the flying capacitor is less than a lower voltage limit within the target voltage range and the voltage of the flying capacitor is greater than that of the low-voltage side unit, by controlling the second switch to be normally open, and controlling the first switch to be turned on in a first time period and to be turned off in a second time period, wherein the first time period is a time period that falls within a switching period of the first switch and that is earlier than the second time period.

4. The three-level converter according to claim 1, wherein the control unit further:

transitions from the first state to the at least one second state when the voltage of the flying capacitor is greater than an upper voltage limit within the target voltage range and the voltage of the flying capacitor is less than that of the low-voltage side unit, by controlling the second switch to be normally closed, and controlling the first switch to be turned on in a first time period and to be turned off in a second time period, wherein the first time period is a time period that falls within a switching period of the first switch and that is earlier than the second time period.

5. The three-level converter according to claim 1, wherein the control unit further:

transitions from the first state to the at least one second state when the voltage of the flying capacitor is greater than an upper voltage limit within the target voltage range and the voltage of the flying capacitor is greater than that of the low-voltage side unit, by controlling the first switch to be normally open, and controlling the second switch to be turned on in a first time period and to be turned off in a second time period, wherein the first time period is a time period that falls within a switching period of the second switch and that is earlier than the second time period.

6. The three-level converter according to claim 1, wherein the control unit further:

transitions from the first state to the at least one second state when the voltage of the flying capacitor is less than a lower voltage limit within the target voltage range and the voltage of the flying capacitor is less than that of the low-voltage side unit, by controlling the third switch to be normally open, and control the fourth switch to be turned on in a first time period and to be turned off in a second time period, wherein the first time period is a time period that falls within a switching period of the fourth switch and that is earlier than the second time period.

7. The three-level converter according to claim 1, wherein the control unit further:

transitions from the first state to the at least one second state when the voltage of the flying capacitor is less than a lower voltage limit within the target voltage range and the voltage of the flying capacitor is greater than that of the low-voltage side unit, by controlling the fourth switch to be normally closed, and controlling the third switch to be turned on in a first time period and to be turned off in a second time period, wherein the first time period is a time period that falls within a switching period of the third switch and that is earlier than the second time period.

8. The three-level converter according to claim 1, wherein the control unit further:

transitions from the first state to the at least one second state when the voltage of the flying capacitor is greater than an upper voltage limit within the target voltage range and the voltage of the flying capacitor is less than that of the low-voltage side unit, by controlling the fourth switch to be normally open, and controlling the third switch to be turned on in a first time period and to be turned off in a second time period, wherein the first time period is a time period that falls within a switching period of the third switch and that is earlier than the second time period.

9. The three-level converter according to claim 1, wherein the control unit further:

transitions from the first state to the at least one second state when the voltage of the flying capacitor is greater than an upper voltage limit within the target voltage range and the voltage of the flying capacitor is greater than that of the low-voltage side unit, by controlling the third switch to be normally closed, and controlling the fourth switch to be turned on in a first time period and to be turned off in a second time period, wherein the first time period is a time period that falls within a switching period of the fourth switch and that is earlier than the second time period.

10. A power supply system, comprising a battery module and the three-level converter that is connected to the battery module according to claim 1.

11. A control method of a three-level converter, applicable to a control unit in the three-level converter; the three-level converter comprising a high-voltage side unit, a low-voltage side unit, a flying capacitor, a first switch, a second switch, a third switch, and a fourth switch, wherein the first switch, the second switch, the third switch, and the fourth switch are connected in series and connected in parallel to the high-voltage side unit; a series connection point of the first switch and the second switch is connected to a series connection point of the third switch and the fourth switch by using the flying capacitor; the third switch and the fourth switch are connected in series and connected in parallel to the low-voltage side unit, and the method comprises:
- when a voltage of the flying capacitor falls outside a target voltage range, controlling the third switch and the fourth switch to be normally open in a first state, and controlling, based on a voltage of the flying capacitor and a voltage of the low-voltage side unit, each of the first switch and the second switch to be turned on or off, so that the voltage of the flying capacitor falls within the target voltage range; or
- when the voltage of the flying capacitor falls outside the target voltage range, controlling the first switch and the second switch to be normally open in the first state, and controlling, based on a voltage of the flying capacitor and a voltage of the low-voltage side unit, each of the third switch and the fourth switch to be turned on or off, so that the voltage of the flying capacitor falls within target voltage range, and
- wherein the target voltage range is a voltage range that is greater than a difference between a half-intermediate direct current voltage and a preset deviation and is less than a sum of the half-intermediate direct current voltage and the preset deviation, and the half-intermediate direct current voltage is half of the voltage of the high-voltage side unit.

12. The method according to claim 11, further comprising:
- transitioning from the first state to the at least one second state when the voltage of the flying capacitor is less than a lower voltage limit within the target voltage range and the voltage of the flying capacitor is less than that of the low-voltage side unit, by controlling the first switch to be normally closed, and controlling the second switch to be turned on in a first time period and to be turned off in a second time period; and
- the first time period is a time period that falls within a switching period of the second switch and that is earlier than the second time period.

13. The method according to claim 11, further comprising:
- transitioning from the first state to the at least one second state when the voltage of the flying capacitor is less than a lower voltage limit within the target voltage range and the voltage of the flying capacitor is greater than that of the low-voltage side unit, by controlling the second switch to be normally open, and controlling the first switch to be turned on in a first time period and to be turned off in a second time period; and
- the first time period is a time period that falls within a switching period of the first switch and that is earlier than the second time period.

14. The method according to claim 11, further comprising:
- transitioning from the first state to the at least one second state when the voltage of the flying capacitor is greater than an upper voltage limit within the target voltage range and the voltage of the flying capacitor is less than that of the low-voltage side unit, by controlling the second switch to be normally closed, and controlling the first switch to be turned on in a first time period and to be turned off in a second time period;
- the first time period is a time period that falls within a switching period of the first switch and that is earlier than the second time period.

15. The method according to claim 11, further comprising:
- transitioning from the first state to the at least one second state when the voltage of the flying capacitor is greater than an upper voltage limit within the target voltage range and the voltage of the flying capacitor is greater than that of the low-voltage side unit, by controlling the first switch to be normally open, and controlling the second switch to be turned on in a first time period and to be turned off in a second time period; and
- the first time period is a time period that falls within a switching period of the second switch and that is earlier than the second time period.

16. The method according to claim 11, further comprising:
- transitioning from the first state to the at least one second state when the voltage of the flying capacitor is less than a lower voltage limit within the target voltage range and the voltage of the flying capacitor is less than that of the low-voltage side unit, by controlling the third switch to be normally open, and controlling the fourth switch to be turned on in a first time period and to be turned off in a second time period;
- the first time period is a time period that falls within a switching period of the fourth switch and that is earlier than the second time period.

17. The method according to claim 11, further comprising:
- transitioning from the first state to the at least one second state when the voltage of the flying capacitor is less than a lower voltage limit within the target voltage range and the voltage of the flying capacitor is greater than that of the low-voltage side unit, by controlling the fourth switch to be normally closed, and controlling the third switch to be turned on in a first time period and to be turned off in a second time period; and
- the first time period is a time period that falls within a switching period of the third switch and that is earlier than the second time period.

18. The method according to claim 11, further comprising:
- transitioning from the first state to the at least one second state when the voltage of the flying capacitor is greater than an upper voltage limit within the target voltage range and the voltage of the flying capacitor is less than that of the low-voltage side unit, by controlling the fourth switch to be normally open, and controlling the third switch to be turned on in a first time period and to be turned off in a second time period; and
- the first time period is a time period that falls within a switching period of the third switch and that is earlier than the second time period.

19. The method according to claim 11, further comprising:
- transitioning from the first state to the at least one second state when the voltage of the flying capacitor is greater than an upper voltage limit within the target voltage range and the voltage of the flying capacitor is greater than that of the low-voltage side unit, by controlling the third switch to be normally closed, and controlling the fourth switch to be turned on in a first time period and to be turned off in a second time period; and
- the first time period is a time period that falls within a switching period of the fourth switch and that is earlier than the second time period.

* * * * *